United States Patent
Leclerc et al.

(10) Patent No.: US 10,288,524 B2
(45) Date of Patent: May 14, 2019

(54) TESTING FIBER ARRANGEMENT IN MULTI-FIBER CABLES

(71) Applicant: EXFO INC., Quebec (CA)

(72) Inventors: Michel Leclerc, Quebec (CA); Mario L'Heureux, St-Nicolas (CA); Stephane Perron, Levis (CA)

(73) Assignee: EXFO Inc., Quebec (CA)

( * ) Notice: Subject to any disclaimer, the term of this patent is extended or adjusted under 35 U.S.C. 154(b) by 62 days.

(21) Appl. No.: 15/427,474

(22) Filed: Feb. 8, 2017

(65) Prior Publication Data

US 2017/0234767 A1  Aug. 17, 2017

Related U.S. Application Data

(60) Provisional application No. 62/294,124, filed on Feb. 11, 2016.

(51) Int. Cl.
*G01M 11/00* (2006.01)
(52) U.S. Cl.
CPC .... *G01M 11/3136* (2013.01); *G01M 11/3145* (2013.01); *G01M 11/3154* (2013.01)
(58) Field of Classification Search
CPC ................................................ G01M 11/3136
USPC ............................................................ 356/73.1
See application file for complete search history.

(56) References Cited

U.S. PATENT DOCUMENTS

| | | | |
|---|---|---|---|
| 5,621,829 A * | 4/1997 | Ford | G02B 6/359 385/115 |
| 7,349,605 B2 | 3/2008 | Noonan et al. | |
| 7,565,055 B2 | 7/2009 | Lu et al. | |
| 8,036,504 B2 | 10/2011 | Lu | |
| 8,041,178 B2 | 10/2011 | Lu et al. | |
| 8,417,114 B1 | 4/2013 | Storey | |
| 8,670,110 B2 | 3/2014 | Schillab et al. | |
| 9,110,249 B2 | 8/2015 | Kewitsch | |
| 9,435,713 B2 | 9/2016 | Collier | |
| 2003/0210850 A1* | 11/2003 | DeAngelis | H04Q 11/0005 385/17 |
| 2007/0086694 A1* | 4/2007 | Murphy | H04B 10/85 385/13 |

(Continued)

FOREIGN PATENT DOCUMENTS

WO   2013181197   12/2013

OTHER PUBLICATIONS

Unknown, "Section 4—Performance Metrics and Administration" in "Data Center Design Guide", LAN-1160-EN, Nov. 2010, p. 49-67, published by Corning Cable Systems, USA.

(Continued)

*Primary Examiner* — Tarifur R Chowdhury
*Assistant Examiner* — Omar H Nixon
(74) *Attorney, Agent, or Firm* — Helene Chotard

(57) ABSTRACT

There is provided a system and a test instrument for identifying or verifying the fiber arrangement and/or the cable type of multi-fiber array cables (such as MPO cables) which employs a light source and a polarity detector at the near end of the multi-fiber array cable under test, and a loopback device at the far end. The polarity detector comprises light presence detectors used to detect which one of the optical fibers of the multi-fiber array cable returns light looped back at the far end and thereby determine the fiber arrangement and/or the cable type of the multi-fiber array cable.

20 Claims, 11 Drawing Sheets

(56) References Cited

U.S. PATENT DOCUMENTS

| | | |
|---|---|---|
| 2007/0115456 A1 | 5/2007 | Wisseman |
| 2013/0194566 A1* | 8/2013 | Schell ................ G01M 11/3136 356/73.1 |
| 2015/0124246 A1* | 5/2015 | Collier ............... G01M 11/3136 356/73.1 |
| 2016/0041065 A1 | 2/2016 | L'Heureux et al. |
| 2016/0349145 A1 | 12/2016 | Irving |

OTHER PUBLICATIONS

Unknown, "Plug & Play Systems with Multi-Fiber Connectors: Polarity Explained", AEN 069, Rev. 9, May 2010, p. 1-7, published by Corning Cable Systems, USA.

* cited by examiner

TESTING FIBER ARRANGEMENT IN MULTI-FIBER CABLES

TECHNICAL FIELD

The invention relates to the characterization of multi-fiber array cables and more specifically to identifying or verifying the fiber arrangement of a multi-fiber array cable.

BACKGROUND OF THE ART

Multi-fiber array cables are widely employed nowadays in premises optical fiber cabling such as in data centers and other intrabuilding optical fiber networks, which require high connectivity density and versatile solutions. Multi-fiber array cables are mostly interconnected and connected to optical network equipment using MPO/MTP® connectors (MPO being the acronym for Multi-fiber Push-On/Pull-Off connectors and MTP a brand name). The most common MPO/MTP® connectors are configured in a 1×12 fiber array but there also exist 2×12 and 2×16 fiber arrays as well as other configurations.

Multi-fiber array cables are also commonly employed in combination with duplex optical cabling and optical fiber transition modules in premises optical fiber cabling. Multi-fiber array cabling may be arranged in duplex or parallel configurations. In a duplex multi-fiber array configuration, the optical fibers are arranged on the multi-fiber connectors such that on pairs of adjacent optical fibers, one fiber is used for transmitting and the other for receiving. Transmission and reception fibers therefore alternate on the connector. In a parallel multi-fiber array configuration, optical fibers used for transmitting and that used for receiving are physically separated into two groups of adjacent fibers on the multi-fiber array connectors. The position of receiving and transmitting optical fibers at a multi-fiber connector defines what is referred to in the industry as the polarity. Array system connectivity requires specific combinations of duplex patch cords, multi-fiber array cables and optical fiber transition modules in order to properly manage polarities in duplex or parallel configurations. The TIA/EIA-568-C.3 Standard conveniently defines guidelines for maintaining fiber polarity in array systems. Because various multi-fiber array configurations are possible (i.e. duplex configuration, one-plug parallel configuration, two-plug one-row parallel configuration and one-plug two-row configuration, see TIA/EIA-568-C.3), various multi-fiber array cable types are defined by the TIA/EIA-568-C.3 Standard, each having a specific 1×12 or 2×12 fiber arrangement. Type A, Type B and Type C (1×12) multi-fiber array cables as defined by the Standard are illustrated in FIGS. 1, 2 and 3 respectively. Type A cables as defined by the Standard are designed with a key inversion but no duplex pair twists between the input and output connectors. Type B cables are designed with no key inversion and no duplex pair twists. Type C cables are designed with a key inversion and with duplex pair twists. In one array systems, combinations of different cable types may be required depending on the multi-fiber array configuration employed. Hence, deployment mistakes can easily occur if the appropriate arrangement of cable types is not followed (e.g. some cables are mixed up) which result in improper fiber polarity at the multi-fiber array connections.

In order to attempt to prevent polarity mistakes, Corning™ has introduced a proprietary Universal Polarity Management Method that employs multi-fiber array cables at both ends of which a proprietary optical fiber transition module is connected. The same optical fiber transition module may be used at both ends. This proprietary optical fiber transition module allows polarity to be properly managed without duplex inversions either on duplex patchcords (see Method A as defined in the TIA/EIA-568-C.3 Standard) or within the multi-fiber array cable (Type C cables), and this irrespective of the deployed multi-fiber array configuration (i.e. duplex vs parallel configuration). But even when employing the Universal Polarity Management Method by Corning™, deployment mistakes may arise if the wrong cable types or optical fiber transition modules are installed.

Of course, other proprietary or custom multi-fiber array cabling systems may be used and may require characterization.

Characterization of optical fiber cabling is required to test network integrity and performance. Tier 1 characterization of multi-fiber array connections includes insertion loss measurements, cable length determination and fiber arrangement/cable type verification. These measurements may be performed with an Optical Loss Test Set (OLTS), comprising a light source at one end of the multi-fiber array connection under test and a power meter at the other end. OLTS measurements are not sufficient for Tier 2 testing which, in addition to encompassing those measurements associated with Tier 1 testing, further require a complete characterization of the various elements along a fiber link. This complete characterization includes connector location, loss and reflection, splice location, loss and reflection, length and insertion loss of individual segments, as well as additional events that may cause insertion loss such as an unwanted optical fiber bend. Optical Time Domain Reflectometry (OTDR—also used to refer to the corresponding device) measurements are therefore required for Tier 2 testing.

In order to properly characterize splice or other connection losses using OTDR measurements in an optical fiber link that may include concatenated singlemode optical fibers segments, the Telecommunications Industry Association (TIA) recommends the use of bi-directional OTDR analysis. Such analysis averages the results of single-ended OTDR measurements acquired in both directions of the fiber link under test (test procedure EIA/TIA FOTP-61 "Measurement of Fiber or Cable Attenuation Using an OTDR"), thereby removing ambiguities associated with single-end OTDR measurements. Small differences in fiber geometry between the different concatenated fiber segments in a link may induce small changes in the backscattering characteristics. As a consequence, this geometry mismatch between spliced or otherwise connected fibers may cause an apparent "gain" or a drop in the backscattered light of OTDR measurements, which introduces a bias in the insertion loss measurement. For example, a fiber connection may appear as a gain in the backscattered light due to a mismatch between the connected fibers. An OTDR measurement performed from the opposite end on the same fiber connection would conversely result in an overestimation of the connection loss. For this reason, the precision obtained with single-end OTDR measurements may not always be sufficient for Tier 1 and/or Tier 2 testing requiring characterization of optical fiber connections and/or overall insertion loss. The Telecommunications Industry Association (TIA) therefore recommends the use of bi-directional OTDR analysis to properly characterize optical fiber links. Bidirectional OTDR measurement also provides unambiguous continuity check.

OLTS methods exist for verifying the fiber arrangement/cable type of multi-fiber array cables but these require an active device to be connected at both end of the multi-fiber array cable under test. Communication means is therefore required between the active devices to complete the verification.

OTDR methods also exist for verifying the fiber arrangement/cable type of multi-fiber array cables (see for example WO 2013/181197 A1 to Collier et al.) but in order to perform bidirectional OTDR analysis with these methods, either two OTDR acquisition devices should be used, i.e. one at each end of the link under test, or a single OTDR acquisition device should be moved from one end to the other.

SUMMARY

It is an object of the present invention to provide a method and a system for identifying or verifying the fiber arrangement/cable type of multi-fiber array cables or cable links which addresses at least some of the above concerns.

In accordance with one aspect, there is provided a system and a test instrument for identifying or verifying the fiber arrangement and/or the cable type of multi-fiber array cables (such as MPO cables) which employs a light source and a polarity detector at the near end of the multi-fiber array cable under test, and a loopback device at the far end. The polarity detector comprises light presence detectors used to detect at which one of the optical fibers of the multi-fiber array cable returns light looped back at the far end and thereby determine the fiber arrangement and/or the cable type of the multi-fiber array cable.

In one embodiment, the light source is part of an optical reflectometry acquisition device for performing optical reflectometry acquisitions toward a plurality of said optical fiber links.

In one embodiment, an optical switch is coupled to the light source and is controllable to successively direct light from the light source toward a plurality of fibers of the multi-fiber array cable. If an optical acquisition device is employed, this further allows bidirectional OTDR measurements on all fibers of the MPO cable with no reconnection by the user (a single connection step is required in order to perform bidirectional OTDR measurements on all fibers of the multi-fiber array cable).

Different loopback configurations are possible.

In all the above-mentioned embodiments, if OTDR acquisitions are performed at the near end of two fibers that are looped back together, a bidirectional OTDR analysis may be provided for each of the two corresponding fiber links. Once the fiber arrangement is determined, knowing that the loopback arrangement is predetermined, it is possible to identify which fiber of the MPO cable corresponds to the second half of the OTDR trace, and then appropriately pair OTDR acquisitions performed at different front fiber ports in order to achieve bidirectional OTDR analysis. The bidirectional OTDR analysis hence provides a complete characterization of the various elements along individual optical fiber. Furthermore, in certain cases, it may also provide insertion loss measurements on each individual optical fiber of the multi-fiber array cable.

The cable length may also be determined from the OTDR acquisitions and the characterization of the multi-fiber array cable is then complete. In this case, Tier 2 testing may be completed using only bidirectional OTDR measurements (i.e. without any need for OLTS measurement) and Tier 1 and Tier 2 testing of multi-fiber array cable links can be performed with a single test instrument.

In accordance with a first aspect, there is provided a system for identifying a fiber arrangement in a multi-fiber cable link comprising a number of optical fiber links each connected between a front multi-fiber connector, at a near end of said cable link, and an end multi-fiber connector, at a far end, according to said fiber arrangement, the system comprising:
  at least one light source to be coupled toward said cable link at said near end for performing optical reflectometry acquisitions toward a plurality of said optical fiber links;
  a loopback device to be coupled to said cable link at said far end and comprising optical fiber loops each arranged to couple one of the optical fiber ports of the end multi-fiber connector to another of its optical fiber ports; and
  a polarity detector to be coupled to said cable link at said near end and comprising at least two light detectors to be coupled to respective ones of the optical fiber links, each one of said light detectors connected toward a corresponding optical fiber link so as to detect at least part of light received therefrom.

In accordance with a second aspect, there is provided a system for identifying a fiber arrangement in a multi-fiber cable link comprising a number of optical fiber links each connected between a front multi-fiber connector, at a near end of said cable link, and an end multi-fiber connector, at a far end, according to said fiber arrangement, the system comprising:
  at least one light source to be coupled toward said cable link at said near end for launching test light toward at least one of a plurality of said optical fiber links;
  a loopback device to be coupled to said cable link at said far end and comprising optical fiber loops arranged to couple each of the optical fiber ports of the end multi-fiber connector to another of its optical fiber ports; and
  a polarity detector to be coupled to said cable link at said near end and comprising at least two presence detectors to be coupled to respective ones of the optical fiber links, each one of said presence detectors connected toward a corresponding optical fiber link so as to detect presence of test light received therefrom In one embodiment, the light source is part of an optical reflectometry acquisition device for performing optical reflectometry acquisitions toward a plurality of said optical fiber links.

In one embodiment, the system further comprises an optical switch coupled to said light source and controllable to successively direct light from said light source toward said plurality of said optical fiber links.

In one embodiment, at least two optical fiber loops of the loopback device each couple optical fiber ports that do not pertain to the same duplex pair (i.e. distinct pairs of longitudinally adjacent optical fiber ports, corresponding to functional duplex pairs in the case of a duplex multi-fiber array configuration) and said at least two optical fiber loops do not couple optical ports of the same two pairs. This test configuration allows for polarity verification and discrimination between Type A and Type C cables without ambiguity. In principle, in order for the discrimination between Type A and Type C to be non-ambiguous, it is sufficient to have only two loopbacks that complies with the above rules. However, in practice, these rules may be applied to more loopbacks for redundancy. In some embodiments, these rules are applied to all loopbacks.

In a further embodiment, a loopback arrangement is further not mirror symmetric relative to a transverse line of symmetry of an optical fiber port arrangement of the end multi-fiber connector. This further test configuration allows for discrimination between Type A, Type B and Type C cables without ambiguity. Again, in principle, in order to obtain non-ambiguous discrimination between Type A and Type B cables, it is sufficient to have a single loopback that complies with the rule of not looping symmetrically relative to the center of a fiber row at the connector array. However, in practice, this rule may be applied to more than one loopback for redundancy. In some embodiments, this rule is applied to all loopbacks.

In a further embodiment, the light source, the optical switch and the polarity detector are integrated and interconnected in a portable test instrument. The integration minimizes the risk of user connection errors and also minimizes wear of connectors resulting from repeated connection and disconnection of optical components together. The most expensive parts of the test system (i.e. the light source, the optical switch and the polarity detector) are then permanently connected inside the portable test instrument, which prevents the optical connectors interconnecting these parts from wear due to connections and disconnections.

In one embodiment, the fiber arrangement at the cable connectors is arranged in a 1×12 array.

In another embodiment, the fiber arrangement at the cable connectors is arranged in a 2×12 array.

Of course, the optical fiber links within the tested multi-fiber array cable link may be either singlemode or multimode.

In accordance with third aspect, there is provided an optical reflectometry system for identifying a fiber arrangement in a multi-fiber cable link comprising a number of optical fiber links each connected between a front multi-fiber connector, at a near end of said cable link, and an end multi-fiber connector, at a far end, according to said fiber arrangement, the system comprising:

an optical reflectometry acquisition device to be coupled toward said cable link at said near end for performing optical reflectometry acquisitions toward a plurality of said optical fiber links;

a loopback device to be coupled to said cable link at said far end and comprising optical fiber loops arranged to couple each of the optical fiber ports of the end multi-fiber connector to another of its optical fiber ports; and a polarity detector to be coupled to said cable link at said near end and comprising at least two light detectors to be coupled to respective ones of the optical fiber links, each said light detectors connected toward a corresponding optical fiber path so as to detect at least part of light received therefrom.

In accordance with a fourth aspect, there is provided a test instrument for identifying a fiber arrangement in a multi-fiber cable link comprising a number of optical fiber links each connected between a front multi-fiber connector, at a near end of said cable link, and an end multi-fiber connector, at a far end, according to said fiber arrangement, the test instrument being for use with a loopback to be coupled to said cable link at said far end and comprising optical fiber loops each arranged to couple one of the optical fiber ports of the end multi-fiber connector to another of its optical fiber ports, the test instrument comprising:

at least one light source to be coupled toward said cable link at said near end for performing optical reflectometry acquisitions toward a plurality of said optical fiber links;

an optical switch coupled to said light source and controllable to successively direct test light from said light source toward said plurality of said optical fiber links; and a polarity detector coupled at one end to said optical switch and at the other end toward the output of the test instrument for coupling to said cable link and comprising at least two presence detectors to be coupled to respective ones of the optical fiber links, each one of said presence detectors connected toward a corresponding optical fiber link so as to detect presence of test light received therefrom.

Although MPO cables and connectors, and MPO patch cord cables are referred to throughout this document, it will be understood that the methods and systems described herein equivalently applies to other multi-fiber array conventions and that the MPO convention is herein employed as an illustrative example because of its wide presence in the datacenter and intrabuilding fiber cable industry.

Multi-fiber array cables are typically configured in a duplex multi-fiber array configuration or in a parallel multi-fiber array configuration. In a duplex configuration, transmitting and receiving fibers alternate longitudinally on the multi-fiber array (e.g. Rx Tx Rx Tx Rx Tx Rx Tx Rx Tx Rx Tx), whereas in a parallel configuration, transmitting and receiving fibers are distinctly grouped. In this case, transmitting and receiving fibers may either be arranged in two groups on a same multi-fiber array cable (e.g. Rx Rx Rx Rx Rx Rx Tx Tx Tx Tx Tx Tx) or separated on distinct multi-fiber array cables (i.e. one cable for the Rx fibers and another cable for the Tx fibers). In practice, the actual configuration of the system is not generally known when testing multi-fiber array cables. Hence, in the present specification, optical fiber ports of any multi-fiber array connector will be conceptually arranged in an inclusive set of distinct pairs of longitudinally adjacent optical fiber ports (1,2; 3,4; 5,6; 7,8; 9,10; 11,12) which will be referred to as "duplex pairs", irrespective of the actual configuration employed in the multi-fiber system.

In this specification, unless otherwise mentioned, word modifiers such as "substantially" and "about" which modify a condition or relationship characteristic of a feature of features of an embodiment, should be understood to mean that the condition or characteristic is defined to within tolerances that are acceptable for proper operation of that embodiment in the context of an application for which it is intended.

Throughout this specification reference is made to optical reflectometric technology and more specifically to OTDR technology. It is noted that optical reflectometric technology is herein meant to encompass all variations of optical reflectometric technology to which the provided method and system may equivalently apply. Examples of such variations include Optical Frequency Domain Reflectometry (OFDR) (e.g., see U.S. Pat. No. 7,515,276 to FROGGATT et al), and coded OTDR technology (see Park et al. "Coded optical time domain reflectometry: principle and applications", Proc. of SPIE Vol. 6781, 678129 (2007)) also referred to as correlation OTDR. Other variations are also meant to be encompassed.

BRIEF DESCRIPTION OF THE DRAWINGS

Further features and exemplary advantages of the present invention will become apparent to the skilled person from the following detailed description, taken in conjunction with the appended drawings, in which:

FIG. 1 (prior art) comprises FIGS. 1A, 1B and 1C which are schematics illustrating a 1×12 multi-fiber array cable of the Type A as defined by the TIA/EIA-568-C.3 Standard, wherein FIG. 1A is a schematic near-end view of the multi-fiber array cable showing the front multi-fiber connector, FIG. 1B is a schematic top view of the multi-fiber array cable, and FIG. 1C is a schematic far-end view of the multi-fiber array cable showing the end multi-fiber connector;

FIG. 2 (prior art) comprises FIGS. 2A, 2B and 2C which are schematics illustrating a 1×12 multi-fiber array cable of the Type B as defined by the TIA/EIA-568-C.3 Standard, wherein FIG. 2A is a schematic near-end view of the multi-fiber array cable showing the front multi-fiber connector, FIG. 2B is a schematic top view of the multi-fiber array cable, and FIG. 2C is a schematic far-end view of the multi-fiber array cable showing the end multi-fiber connector;

FIG. 3 (prior art) comprises FIGS. 3A, 3B and 3C which are schematics illustrating a 1×12 multi-fiber array cable of the Type C as defined by the TIA/EIA-568-C.3 Standard, wherein FIG. 3A is a schematic near-end view of the multi-fiber array cable showing the front multi-fiber connector, FIG. 3B is a schematic top view of the multi-fiber array cable, and FIG. 3C is a schematic far-end view of the multi-fiber array cable showing the end multi-fiber connector;

It will be noted that throughout the appended drawings, like features are identified by like reference numerals.

It should also be understood that when the appended drawings are denoted as schematics, elements of the drawings are not necessarily drawn to scale. Some mechanical or other physical components may also be omitted in order to not unduly encumber the figures.

DETAILED DESCRIPTION

Figure 1:
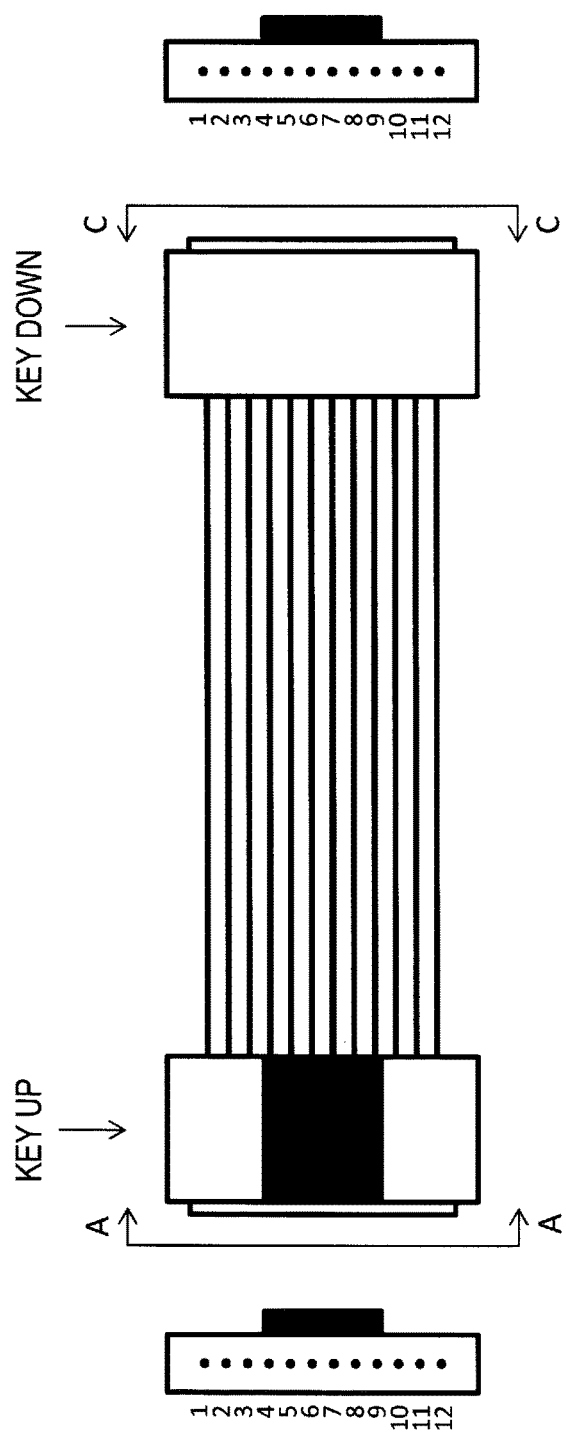

Now referring to the drawings, FIG. 1 illustrates a 1×12 multi-fiber array cable 100 of the Type A as defined by the TIA/EIA-568-C.3 Standard. Although this is not shown on the figure, the cables defined by this Standard actually employ Multi-fiber Push-On/Pull-Off (MPO) connectors and will be referred to herein as MPO cables. An MPO cable 100 has a front multi-fiber (MPO) connector 102 at a near end of the cable 100 and an end multi-fiber (MPO) connector 104 at a far end. A plurality of optical fibers 106 (in this case 12) are connected between the front and end connectors 102, 104. More specifically, respective opposite ends of each fiber 106 terminate at optical fiber ports 107 on the front and the end MPO connectors 102, 104. Each MPO connector 102, 104 has a predefined physical shape as provided by the TIA/EIA-568-C.3 Standard for compatibility with the other components in the industry. This shape includes a key 112 which is in the form of a protrusion on one side of the connector and which serves to set the orientation in which the connector may be inserted in a corresponding receiving socket (such as that of MPO adapters). As can be seen from FIG. 1, in a Type A cable there is a key inversion between the front connector 102 and the end connector 104 (when the optical fibers lie flat on a surface): the key 112 is up on the front connector 102 and down on the end connector 104 (or vice-versa). Accordingly, when looking at the end surface 108 of the front connector 102 with the key 112 disposed upwardly, fibers no. 1 to 12 are arranged from left to right (see FIG. 1A). Similarly, when looking at the end surface 110 of the end connector 102 with the key 112 disposed upwardly, fibers no. 1 to 12 are also arranged from left to right (see FIG. 1C).

Figure 2:
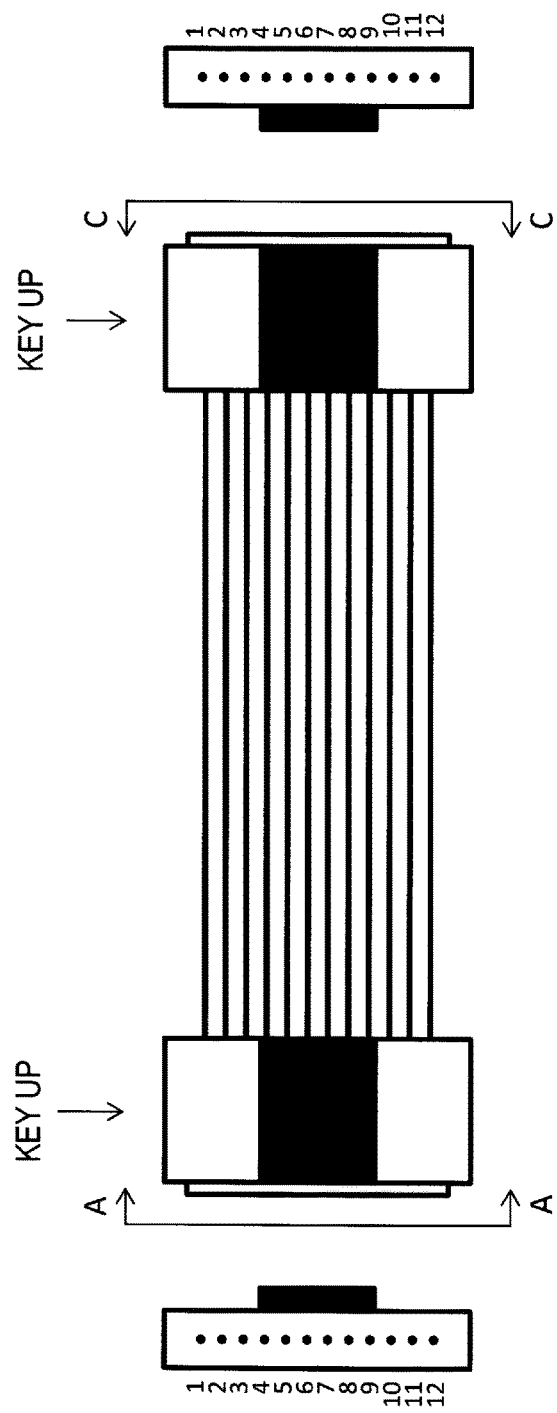

FIG. 2 illustrates a 1×12 MPO cable 200 of the Type B as defined by the TIA/EIA-568-C.3 Standard. Type B cables are very similar to Type A cables and like features will therefore not be repeatedly described. As can be seen from FIG. 2, in a Type B cable there is a no key inversion between the front connector 202 and the end connector 204 (when the optical fibers lie flat on a surface): when the key is up on the front connector 202 it is also up on the end connector 204. Accordingly, when looking at the end surface 208 of the front connector 202 with the key disposed upwardly, fibers no. 1 to 12 are arranged from left to right, whereas when looking at the end surface 210 of the end connector 202 the order of the fibers is inverted such that, when the key disposed upwardly, fibers no. 1 to 12 are arranged from right to left.

Figure 3:
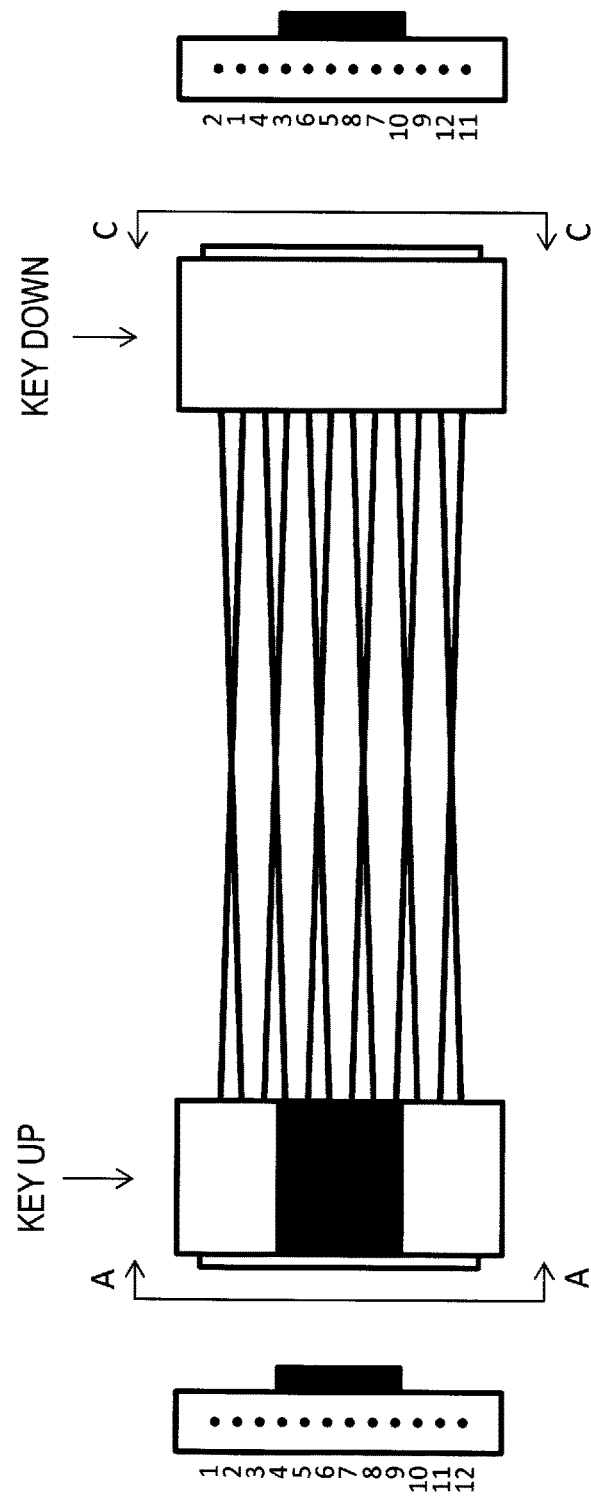

Knowing that in duplex multi-fiber array configurations, the receiving optical fibers are generally associated with odd-numbered optical fibers ports (1, 3, 5, 7, 9, 11) and the transmitting optical fibers associated with even-numbered optical fibers ports (2, 4, 6, 8, 10, 12), mistakenly installing a Type B cable instead of a Type A cable in a duplex multi-fiber array configuration would result in a fiber polarity inversion at the end connector. Moreover, knowing that in one-row parallel multi-fiber array configurations, the transmitting optical fibers are generally associated with the first half of consecutive optical fibers ports (1 to 6) and receiving optical fibers with the second half of consecutive optical fibers ports (7 to 12) or vice-versa, mistakenly installing a Type B cable instead of a Type A cable in a one-row parallel multi-fiber array configuration would also result in a fiber polarity inversion at the end connector FIG. 3 illustrates a 1×12 MPO cable 300 of the Type C as defined by the TIA/EIA-568-C.3 Standard. Type C cables are also very similar to Type A cables and like features will therefore not be repeatedly described. As can be seen from FIG. 3, as in a Type A cable, in a Type C cable there is a key inversion between the front connector 302 and the end connector 304 (when the optical fibers lie flat on a surface):

when the key is up on the front connector 202 it down on the end connector 204. However, duplex pairs are crossed over in what is referred to herein as duplex pair twists, i.e. optical fiber ports 1, 3, 5, 7, 9, 11 on the front connector 302 are respectively linked to optical fiber ports 2, 4, 6, 8, 10, 12 on the end connector 304 and vice-versa. Accordingly, when looking at the end surface 308 of the front connector 302 with the key disposed upwardly, fibers no. 1 to 12 are arranged from left to right, whereas when looking at the end surface 310 of the end connector 302 with the key disposed upwardly, the sequence of the fibers at the optical fiber ports is 2, 1, 4, 3, 6, 5, 8, 7, 10, 9, 12, 11. As a consequence, mistakenly installing a Type C cable instead of a Type A cable in a duplex multi-fiber array configuration would result in a fiber polarity inversion at the end connector. Similarly, mistakenly installing a Type C cable instead of a Type B cable in a one-row parallel multi-fiber array configuration would also result in a fiber polarity inversion at the end connector.

In summary, Type A cables as defined by the Standard are designed with a key inversion but no duplex pair twists between the front and end connectors. Type B cables are designed with no key inversion and no duplex pair twists. Type C cables are designed with a key inversion and duplex pair twists.

Test System

Figure 4:
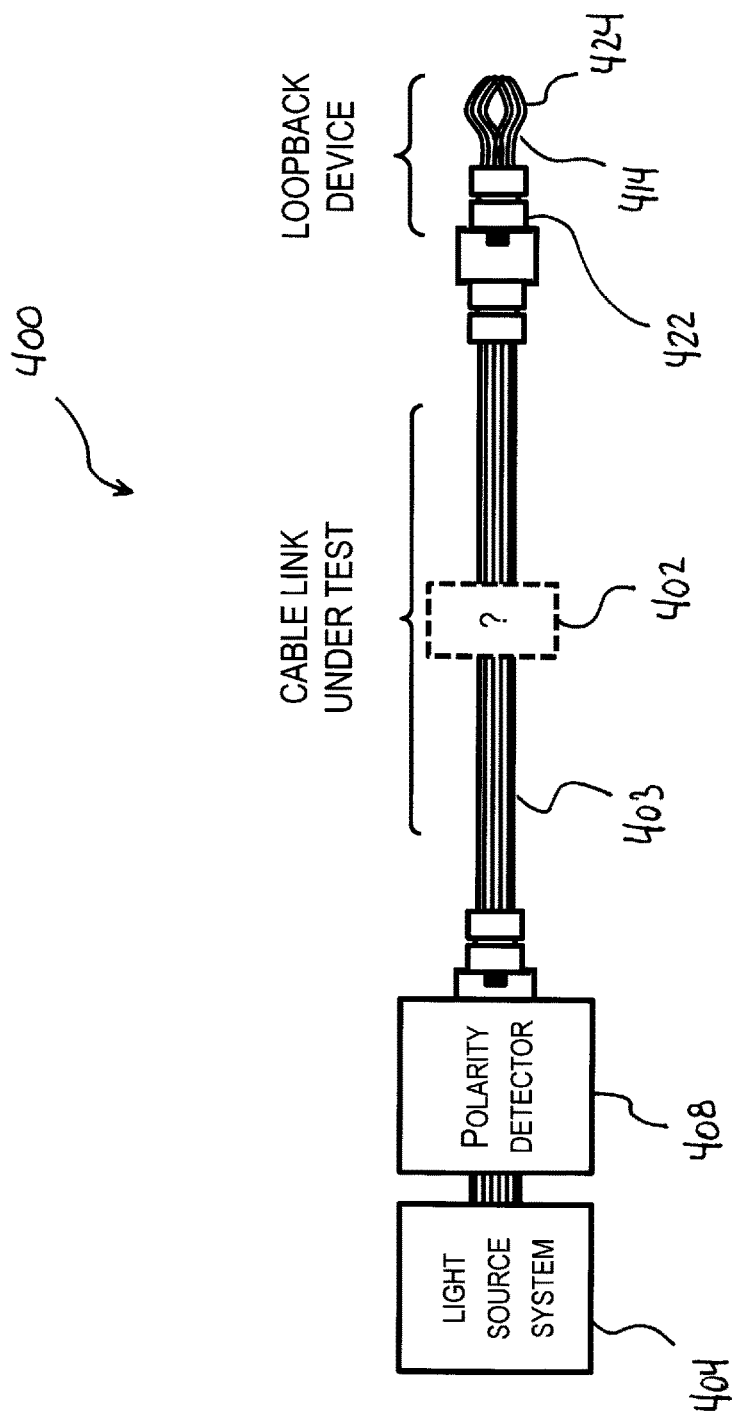
FIG. 4 is a schematic illustrating a test system for identifying a fiber arrangement in a multi-fiber cable link, in accordance with one embodiment employing a light source system.

FIG. 4 shows an embodiment of a test for identifying a fiber arrangement in a 1×12 MPO cable link 402 comprising a plurality (in this case 1×12) of optical fiber links 403. The test system 400 comprises a light source system 404, a polarity detector 408 directly connected to the output of the light source system 404 and coupled toward the near end of the MPO cable link under test 402, and a loopback device 414 coupled to the far end of the MPO cable link under test 402.

The light source system 404 comprises at least one light source to be coupled toward the cable link 402 at what is referred to herein as the near end, for launching test light toward a plurality of the optical fiber links 403, successively (in the forward direction, i.e., from the near end toward the far end). It should be understood that the near and far ends of the cable link under test 402 are only defined in relative to the location of the light source system 404 and that the light source system 404 may actually be coupled to any end of the cable link 402. The light source system 404 is employed to launch light toward at least one but typically successively to all the optical fiber links 403 of the tested cable link 402 in order to test each link.

In one embodiment, the light source system 404 comprises a single light source coupled toward a single one of the optical fiber links 403. As will be explained hereinbelow, launching test light toward a single one of the optical fiber links 403 can allow for polarity verification and discrimination between Type A, Type B and Type C cables without ambiguity and identifying all combinations of key inversions and duplex pair twists. However, in practice, the light source system 404 may comprise a plurality of light sources each coupled to one of the optical fiber links 403. Depending on the configuration, polarity may be tested by switching the light sources on successively and detecting presence of test light at the polarity detector 608 for each light source or switching on a plurality of light sources and detecting a pattern of received light source at the polarity detector 608. In another embodiment, the light source system 404 comprises a single light source coupled to an optical switch (a 1×12 optical switch for example) controllable to successively direct light from the light source to the plurality of optical fiber links 403.

The polarity detector 408 comprises at least two light detectors to be coupled to respective ones of the optical fiber links. Each light detector is connected toward a corresponding optical fiber link so as to detect presence of test light received therefrom (light exiting the optical fiber link after loopback and propagation in the backward direction, i.e., from the far end to the near end). More specifically, the light detectors are for detecting the presence of light exiting the corresponding optical fiber link 403. In one embodiment, the polarity detector 408 comprises only two light detectors. It will be understood that detecting light received from two of the optical fiber links 403 can allow for polarity verification and discrimination between Type A, Type B and Type C cables without ambiguity and identifying all combinations of key inversions and duplex pair twists. However, in practice, the polarity detector 408 may comprise more than two light detectors each coupled to one of the optical fiber links 403. In one embodiment, the polarity detector 408 has a light detector for each optical fiber link 403 of the cable link under test 402. The polarity detector 408 is described in more detail hereinafter with reference to FIG. 5.

The loopback device 414 comprises an MPO connector 422 having a plurality (in this case 1×12) of optical fiber ports and at least two of optical fiber loops 424 that couple one of the optical fiber ports of the end multi-fiber connector to another of its optical fiber ports. It will be understood that looping only two of the optical fiber links 403 to other optical fiber links can allow for polarity verification and discrimination between Type A, Type B and Type C cables without ambiguity and identifying all combinations of key inversions and duplex pair twists. However, in practice, the loopback device 414 may comprise more than two loops. In one embodiment, each of the optical fiber ports is coupled to another of the optical fiber ports.

It will be understood that the loopback device 414 may be enclosed in a casing (not shown) further comprising an input MPO adaptor to which the cable link under test or a receive cable (not shown) is to be connected. The loopback device 414, including possible loopback arrangements, is described in more detail hereinafter with reference to FIGS. 6, 7 and 8.

It is noted that the different components of the test system 400, namely the light source system 404, the polarity detector 408 and the loopback device 414 may be sold separately and meant to be connected by an operator according to a predetermined test method. In some embodiments, the light source system 404 and the polarity detector 408 are integrated and permanently interconnected in a test instrument (typically a portable test instrument).

Polarity Detector

Figure 5:
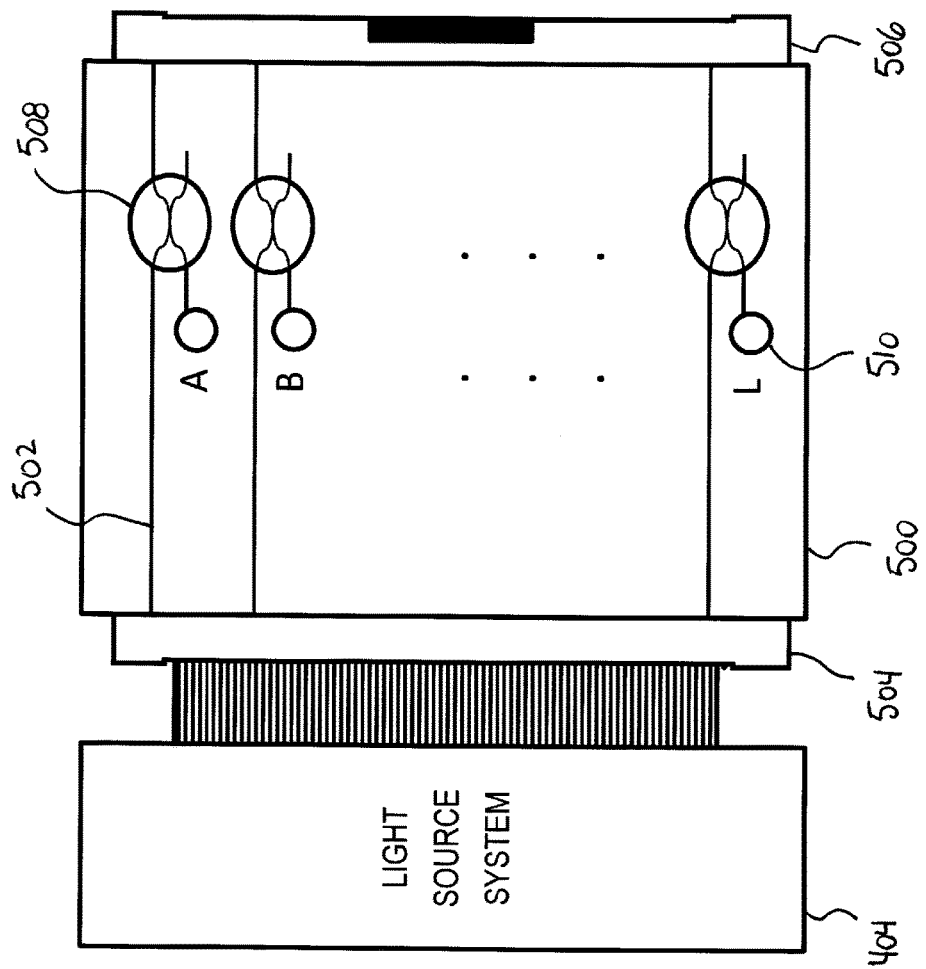
FIG. 5 is a schematic illustrating a polarity detector to be used in the test system of FIG. 4, in accordance with one embodiment.

FIG. 5 illustrates an exemplary embodiment 500 of the polarity detector 408 to be employed in the test system 400 of FIG. 4. The polarity detector 500 comprises a plurality (in this case 1×12) of optical fiber paths 502 between an input MPO connector 504 to be connected toward the light source system 404 and an output MPO connector 506 to be connected toward the cable link under test 402 or a launch fiber. Each optical fiber paths 502 has a corresponding optical power splitter 508 therealong such that each optical power splitter 508 is coupled to a respective optical fiber link 403 of the cable link under test 402, and a corresponding light detector 510 (defining light detectors A to L). Each optical power splitter 508 is connected such that part of light received from the light source system 404 is directed toward one of the optical fiber link 403 (usually 50% or more) and part of light received from the optical fiber link 403 is directed to the corresponding light detector 510. Each pair of optical power splitter 508 and light detector 510 together form a presence detector to detect presence of test light received from a corresponding optical fiber link.

The optical power splitters 508 may be embodied by fiber couplers such as fused fiber couplers for example. Various coupling ratio may be employed such as a 50/50 coupling ratio or a 95/5 coupling ratio for example. The coupling ratio may either be large band or narrow band, depending on the optical spectrum of the light source(s).

The light detectors 510 may be embodied by photodiodes or photoresistors for example, keeping in mind that power measurement is not necessarily required as long as presence of light can be detected. It may also be envisaged to embody the light detectors 510 on a single photodiode array.

This embodiment allows launching light toward each optical fiber link 403 and detecting the presence of light returning from each optical fiber link 403 (after being loopback). It is however noted that, in other embodiments, light can be launched in only some optical fiber link 403 and the presence of light returning from only some of the optical fiber links 403 be detected.

OTDR Test System

Figure 6:
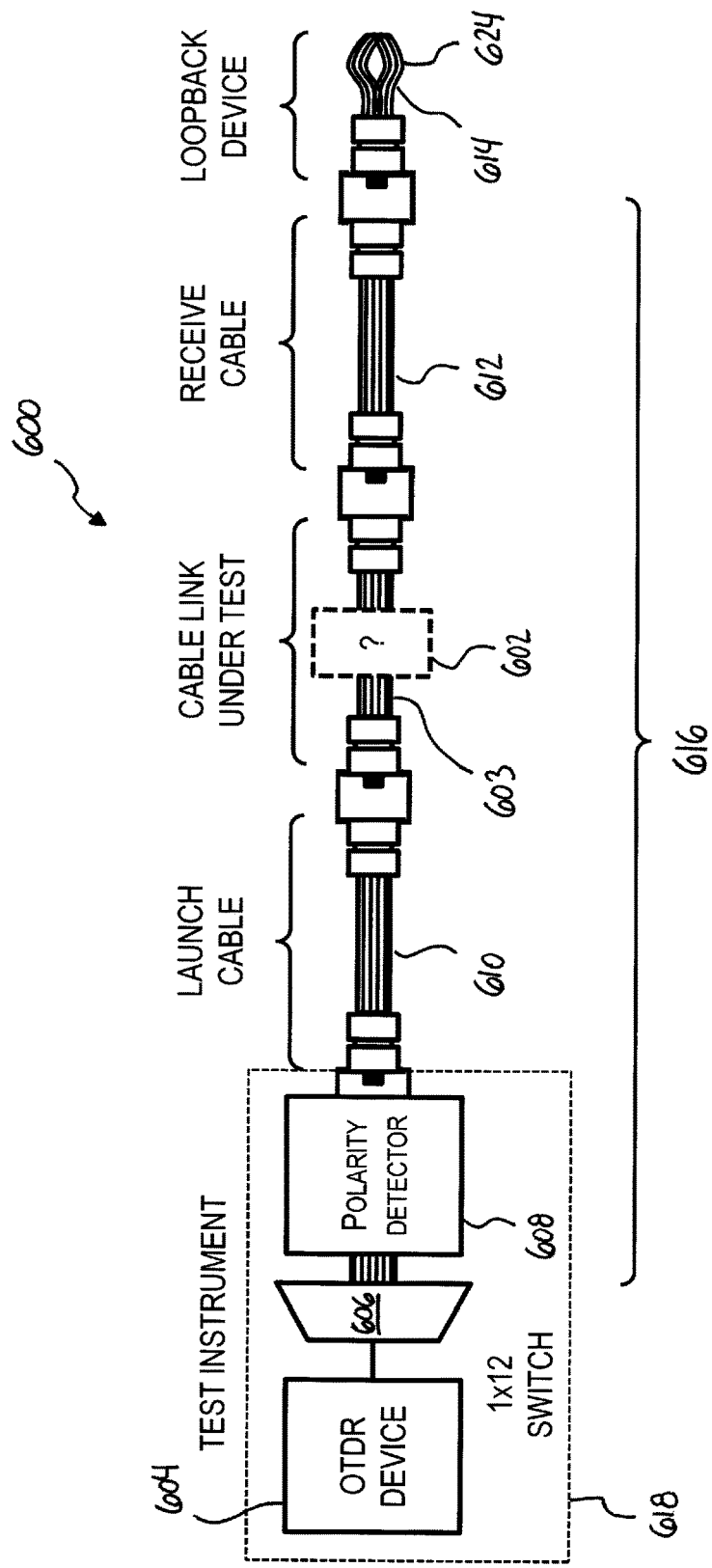
FIG. 6 is a schematic illustrating an OTDR system for identifying a fiber arrangement in a multi-fiber cable link, in accordance with one embodiment.

FIG. 6 shows an embodiment of the test system 400 of FIG. 4 in which an optical reflectometry system is employed, and more specifically in this case an OTDR system 600, for identifying a fiber arrangement in an MPO cable link 602 comprising a plurality of optical fiber links 603. In addition to identifying the fiber arrangement of the multi-fiber cable under test, it further advantageously allows characterization and diagnostic on the cable under test. In this case, the pulsed light source of the OTDR system represents the light source of the light source system 402 of the test system 400. The OTDR system 600 is otherwise similar to the test system 400 of FIG. 4 and similar features will not be repeatedly described.

The OTDR system 600 comprises an optical reflectometry acquisition device, in this case an OTDR acquisition device 602, an optical switch 406 coupled to the output of the OTDR acquisition device 602, a polarity detector 608 coupled to the output of the optical switch 606, a launch cable 610 to be connected between the polarity detector 608 and the near end of the MPO cable link under test 602, a receive cable 612 and a loopback device 614, the receive cable 612 to be connected between the far end of the MPO cable link under test 602 and the loopback device 614. It is noted that the OTDR acquisition device 602 and the optical switch 606 together constitute a light source system.

OTDR is a diagnostic technique for optical fiber links where a test signal in the form of light pulses is launched in the fiber link under test and the return light signal, arising from backscattering and reflections along the fiber link, is detected and analyzed. Various events along the fiber link can be detected and characterized through a proper analysis of the return signal in the time domain. The acquired power level of the return signal as a function of time is referred to as the OTDR trace, where the time scale is representative of distance between the OTDR acquisition device and a point along the fiber link. As known in the art, OTDR acquisitions are typically performed with launch and receive cables respectively connected to the near and the far ends of the fiber link in order to allow total loss characterization of the link. In some embodiments, in order to undertake a bi-directional characterization, single-end OTDR measurements are be performed in both forward and backward directions on the fiber link. For singlemode cable links, identification and characterization of events and optical fiber segments along the fiber link is obtained by a proper analysis of the forward and backward-direction OTDR acquisitions. The events are typically characterized in terms of location, insertion loss and reflectance parameters while optical fiber segments may be characterized in terms of length and attenuation parameters. Such analysis may be useful for fiber link diagnosis and provides the necessary characterization for Tier 2 testing which requires a complete characterization of the various elements along each fiber link, including connector location, loss and reflection, splice location, loss and reflection, length and insertion loss of individual segments, as well as additional events that may cause insertion loss such as an unwanted optical fiber bend.

When the OTDR system 600 is connected to the cable link under test 602, the combination of the polarity detector 608, the launch cable 610, the cable link under test 602 and the receive cable 612 defines a plurality (e.g., 1×12) of optical fiber links 616 on which OTDR acquisitions are to be performed. Of course, each of the polarity detector 608, the launch cable 610, the cable link under test 602 and the receive cable 612 have 1×12 optical fiber paths between their respective input and output ends. In some embodiments, in order to undertake bi-directional characterizations of each optical fiber links 603 of the cable link under test 602, a forward and backward OTDR acquisition is performed on each of the plurality of optical fiber links 616.

The OTDR acquisition device 604 comprises conventional optical hardware and electronics as known in the art for performing OTDR acquisitions on an optical fiber link. The OTDR acquisition device 604 is to be coupled to the cable link 602 at what is referred to herein as the near end. The OTDR acquisition device 604 is employed to perform OTDR acquisitions toward at least one but typically all the optical fiber links 603 of the tested cable link 602 in order to test each link.

In this embodiment, the OTDR acquisition device 604 has a single optical output. In order to perform OTDR acquisitions on a plurality of optical fiber links 603 of the cable link 402, the 1×12 optical switch 606 is coupled at the output of the OTDR acquisition device 602 and is controllable to successively direct the test signal to the plurality of optical fiber links 603. Of course, in order to allow OTDR acquisitions, the optical switch 606 should be bidirectional. It should be noted that, instead of using an optical switch, an operator could manually and successively connect the OTDR acquisition device 602 to a plurality of optical fiber ports, by following or not instructions given by a user interface. Of course, other redirecting means may also be envisaged.

In this embodiment, the OTDR acquisition device 604, the optical switch 606 and the polarity detector 608 are integrated together in a portable test instrument 618. The 1×12 optical inputs of the signature array 608 are respectively connected in the test instrument 618 to the 1×12 optical outputs of the optical switch 606. The optical interconnection may be made, for instance, through an MPO cable although other options may be envisaged. It is still noted that the OTDR acquisition device 604, the optical switch 606 and the polarity detector 608 could instead be provided separately for the test operator to interconnect them for performing characterization of the cable link under test 602.

The OTDR system 600 may employ the polarity detector 500 of FIG. 5.

The launch cable 610 and the receive cable 612 are MPO cables of predetermined lengths which are chosen among other things as a function of the overall length and the expected insertion loss of the tested cable link 602. For example, when employing best in class OTDR devices for testing premises optical fiber cabling shorter than 300 m or so and having insertion loss lower than 3 dB, the length of launch and receive cables may be of 10 to 25 m or so. Longer launch and receive cables may be required in presence of high reflectance (>−45 dB), higher link loss or length, or if OTDR performances are limited (e.g. longer dead zones, less dynamic range). Longer launch and receive cables are also needed for testing Wide Area Network (WAN) telecommunication links. In this embodiment, the launch cable 610 and the receive cable 612 are Type A cables and the launch cable 610, the cable link under test 602, the receive cable 612 and the loopback device 614 are interconnected using Type A (key-up-key-down) MPO adapters 620. It should be understood that a different convention may be used as long as it is so predetermined or characterized before test measurements are undertaken.

The loopback device 614 comprises an MPO connector 622 having a plurality (in this case 1×12) of optical fiber ports and a plurality of optical fiber loops 624 that couples each of the optical fiber ports to another of the optical fiber ports. It will be understood that the loopback device 614 may be enclosed in a casing (not shown) further comprising an input MPO adaptor to which the receive cable 612 is to be connected in order to mate the MPO connector 622 of the loopback device 614 with the output MPO connector 626 of the receive cable 612. The loopback device 614, including possible loopback arrangements, is described in more detail hereinafter with reference to FIGS. 7, 8 and 9.

Loopback Device

Figures 7A, 7B:
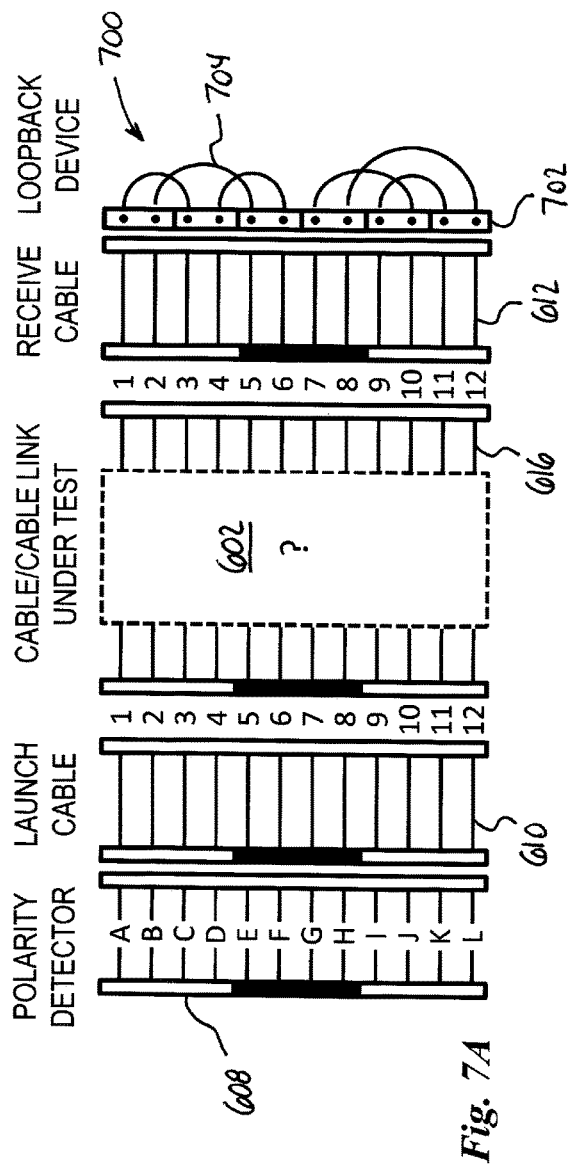
FIG. 7 comprises FIG. 7A which is a schematic illustrating a first test configuration employing a loopback device in accordance with a first embodiment, and FIG. 7B which is a table showing the corresponding detection patterns on the polarity detector for different types of cable link under test.

FIG. 7A schematically illustrates a first embodiment of a loopback device 700 and the corresponding test configuration comprising the polarity detector 608, the launch cable 610, the cable link under test 602, the receive cable 612 (see FIG. 6) and the loopback device 700. The combination of the polarity detector 608, the launch cable 610, the cable link under test 602 and the receive cable 612 defines a plurality (in this case 1×12) of optical fiber links 616 on which OTDR acquisitions are to be undertaken using the OTDR system 600 of FIG. 6. The loopback device 700 may be employed for example with the polarity detector 500 of FIG. 5 for testing a fiber arrangement of the cable link under test 602. It is noted that although the loopback device 700 and the test configuration is described herein in combination with an OTDR system including launch and receive cables 610, 612, it may equivalently apply to a test system such as the test system 400 that described with reference to FIG. 4.

The loopback device 700 comprises an input MPO connector 602 and six loops 604 of optical fiber that each couple one port of the input MPO connector 602 to another. The length of the six loops are typically similar to that of launch and receive cables (i.e. about 10 to 25 m for testing "premises" optical fiber cabling shorter than 300 m or so and having insertion loss lower than 3 dB) and are also chosen among other things as a function of the overall length and the expected insertion loss of the tested cable link 402 in order to also allow the characterization of the input MPO connector 602 using the OTDR measurements. In this embodiment, port 1 is coupled back to port 3, port 2 is coupled back to port 5, port 4 is coupled back to port 6, port 7 is coupled back to port 10, port 8 is coupled back to port 12 and port 9 is coupled back to port 11, as shown in Table 1. Also, in this embodiment, the optical fiber loop 604 are of substantially equal length which makes it easier to segment an OTDR trace to identify which portion of it corresponds to the loopback device 600.

TABLE 1

| Loopback configuration of loopback device 700 of FIG. 7A | |
| --- | --- |
| 1 | 3 |
| 2 | 5 |
| 3 | 1 |
| 4 | 6 |
| 5 | 2 |
| 6 | 4 |
| 7 | 10 |
| 8 | 12 |
| 9 | 11 |
| 10 | 7 |
| 11 | 9 |
| 12 | 8 |

FIG. 7B shows the corresponding light presence detection on the polarity detector 608 as a function of the input port on which light is launch, and this for the different types of cable links under test. In order to properly identify or verify the cable type of the cable link under test 602, the OTDR system 600 (FIG. 6) should be able to identify without ambiguity any combinations of key inversions and duplex pair twists. It should be noted that concatenations of Type A, Type B and Type C MPO cables with Type A (key-up-key-down) and Type B (key-up-key-up) MPO adapters will result in four different types of overall cable link arrangements. It is generally not necessary to recognize each segment of the overall cable link under test 602, as every combination will generally be equivalent to either a Type A cable (key inversion/no pair twist), a Type B cable (no key inversion/no pair twist), a Type C cable (key inversion/pair twists) or a combination of a Type B cable, a Type A adaptor and a Type C cable (no key inversion/pair twists). It is therefore only necessary to identify key inversions and duplex pair twists. It is also noted that interchanging Type A and Type B adaptors will simply result in switching between a key inversion and no key inversion arrangements. For example, the concatenation of two Type A cables with a Type B adaptor (instead of a Type A adaptor) is equivalent to a Type B cable (no key inversion/no pair twist). The system may therefore identify a Type B cable when there was actually no Type B cable connected because the overall cable link under test is equivalent to a Type B cable.

FIG. 7B comprises four columns corresponding to the four possible fiber arrangements, respectively a Type A cable (key inversion/no pair twist), a Type B cable (no key inversion/no pair twist), a Type C cable (key inversion/pair twists) and the combination of a Type B cable, a Type A adaptor and a Type C cable (no key inversion/pair twists). Each column has a first sub-column indicating the optical fiber port (from 1 to 12) on which an OTDR acquisition is undertaken and a second sub-column indicating on which light detector (from A to L) of the polarity detector 608 light would be detected. As such, in the case of a Type A cable, when launching an OTDR acquisition on port 5 at the output of the polarity detector 608, light will be detected on light detector B. The OTDR trace may be segmented as follows, in this order: fiber 5 of the launch cable 610, fiber 5 of the cable link under test 602, fiber 5 of the receive cable 612, loop from 5 to 2 of the loopback device 700, fiber 2 of the receive cable 612, fiber 2 of the cable link under test 602, fiber 2 of the launch cable 610 and detector B of the polarity detector 608. As can be seen in FIG. 7B, with this loopback configuration, a single OTDR acquisition launched on fiber 5, fiber 6, fiber 7 or fiber 8 provides unambiguously identification of the cable type, i.e. any combination of key inversions and duplex pair twists. When test light is launched on fiber 5, a Type A cable is identified (key inversion/no pair twist) if test light is detected on detector B; a Type B cable is identified (no key inversion/no pair twist) if test light is detected on detector A; a Type C cable is identified (key inversion/pair twist) if test light is detected on detector C; and no key inversion with pair twists configuration is identified if test light is detected on detector D.

It should be noted that it is not necessary that a light detector be present on all the optical fiber paths of the polarity detector 608 for unambiguous identification of the fiber arrangement using a single OTDR acquisition. For example, having light detectors A, B and C only (and no light detector on the other optical fiber paths) would allow unambiguous identification of the cable type using an OTDR acquisition performed on fiber 5.

It should also be observed that using the loopback device 700 that would only have a light detector on optical fiber path 5 (light detector E), i.e. and no light detector on the other optical fiber paths, would allow unambiguous identification of the cable type using OTDR acquisitions performed on fiber 1, 2, 3 and 4. However, in this case, it is not possible generally to obtain unambiguous identification of the cable type using a single OTDR acquisition. Up to three OTDR acquisitions (on fiber 1, 2, 3 or 4) may be needed to unambiguously identify the cable type.

It should be noted that, in order to allow duplex pair twists verification and hence discrimination between Type A and Type C cables, the loopback device 700 is designed such that fibers are not looped back with the other fiber of a same duplex pair. Otherwise, the same signature would appear on the OTDR trace, irrespective of the presence of duplex pair twists, e.g. whether a Type A or Type C cable is tested. Similarly, the loopback device 700 is also not mirror symmetric relative to a transverse line of symmetry of the fiber row (it is not horizontally symmetric in FIG. 7A), in order to allow identification of key inversions and hence discrimination between Type A and Type B cables.

Figures 8A, 8B:
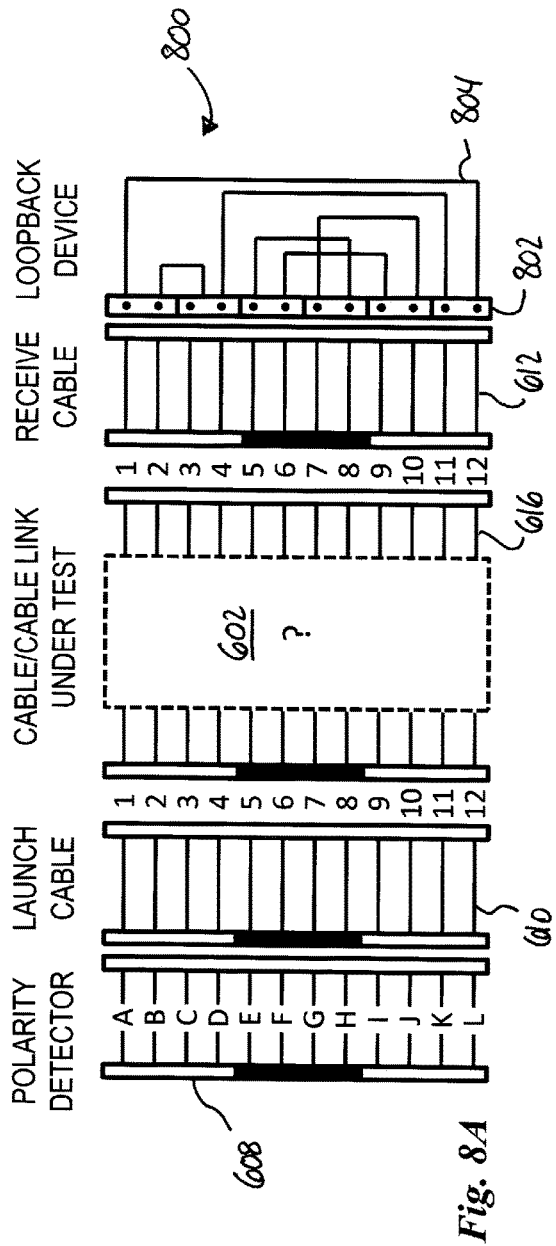
FIG. 8 comprises FIG. 8A, which is a schematic illustrating a second test configuration employing a loopback device in accordance with a second embodiment, and FIG. 8B, which is a table showing the corresponding detection patterns on the polarity detector for different types of cable link under test.

FIG. 8A schematically illustrates a second embodiment of a loopback device 800 and the corresponding test configuration comprising the polarity detector 608, the launch cable 610, the cable link under test 602, the receive cable 612 (see FIG. 4) and the loopback device 800. In this embodiment, port 1 is coupled back to port 12, port 2 is coupled back to port 3, port 4 is coupled back to port 11, port 5 is coupled back to port 8, port 6 is coupled back to port 9 and port 7 is coupled back to port 10, as shown in Table 2.

As for the loopback device 700 of FIG. 7A, the loopback device 800 and test configuration of FIG. 8A may as well be suitable for use with a test system such as the test system 400 described with reference to FIG. 4.

TABLE 2

Loopback configuration of loopback device 800 of FIG. 8A

| | |
|---|---|
| 1 | 12 |
| 2 | 3 |
| 3 | 2 |
| 4 | 11 |
| 5 | 8 |
| 6 | 9 |
| 7 | 10 |
| 8 | 5 |
| 9 | 6 |

TABLE 2-continued

Loopback configuration of loopback device 800 of FIG. 8A

| | |
|---|---|
| 10 | 7 |
| 11 | 4 |
| 12 | 1 |

The plurality of optical fiber ports of the input MPO connector 802 of the loopback device 800 has alternating even- and odd-numbered optical fiber ports (corresponding to the alternating Rx and Tx polarities in the case of a duplex multi-fiber array configuration). In the embodiment of FIG. 8A, each optical fiber loop of the loopback device 800 couples an even optical fiber port to and odd optical fiber port (an Rx port is always coupled with a Tx port in the case of a duplex configuration).

FIG. 8B shows the corresponding light presence detection on the polarity detector 608 as a function of the input port on which light is launch, and this for the different types of cable links under test. As can be seen in FIG. 8B, with this loopback configuration, a single OTDR acquisition launched on fiber 3, fiber 4, fiber 9 or fiber 10 provides unambiguous identification of the cable type, i.e. any combination of key inversions and duplex pair twists.

Figures 9A, 9B:
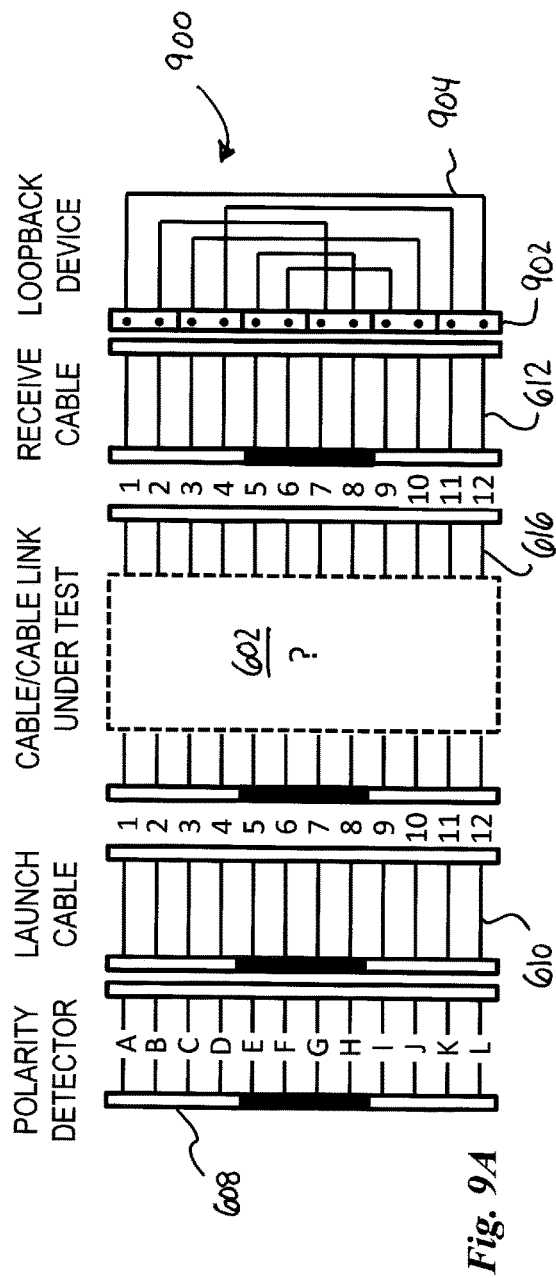
FIG. 9 comprises FIG. 9A, which is a schematic illustrating a third test configuration employing a loopback device in accordance with a third embodiment, and FIG. 9B, which is a table showing the corresponding detection patterns on the polarity detector for different types of cable link under test.

FIG. 9A schematically illustrates a third embodiment of a loopback device 900 and the corresponding test configuration comprising the polarity detector 608, the launch cable 610, the cable link under test 602, the receive cable 612 (see FIG. 6) and the loopback device 900. In this embodiment, port 1 is coupled back to port 12, port 2 is coupled back to port 7, port 4 is coupled back to port 11, port 5 is coupled back to port 8, port 6 is coupled back to port 9 and port 7 is coupled back to port 2, as shown in Table 3.

As for the loopback device 700 of FIG. 7A, the loopback device 900 and test configuration of FIG. 9A may as well be suitable for use with a test system such as the test system 400 that described with reference to FIG. 4.

TABLE 3

Loopback configuration of loopback device 900 of FIG. 9A

| | |
|---|---|
| 1 | 12 |
| 2 | 7 |
| 3 | 10 |
| 4 | 11 |
| 5 | 8 |
| 6 | 9 |
| 7 | 2 |
| 8 | 5 |
| 9 | 6 |
| 10 | 3 |
| 11 | 4 |
| 12 | 1 |

The plurality of optical fiber ports of the input MPO connector 902 of the loopback device 900 may be conceptually split into a first and a second group of a same number of longitudinally adjacent optical fiber ports (ports 1-6 in a first group and ports 7-12 in a second group). In this embodiment, the optical fiber loops 904 of the loopback device 900 each couple an optical fiber port of the first group to an optical fiber port of the second group. In addition, in the embodiment of FIG. 9A, each optical fiber loop of the loopback device 900 couples an even optical fiber port to and odd optical fiber port.

FIG. 9B shows the corresponding combination of signatures as detectable on OTDR traces acquired from the plurality of optical fiber links 616, for the different possible fiber arrangements of the cable link under test 602. As can be seen in FIG. 9B, with this loopback configuration, no single acquisition provides unambiguously identification of the cable type. In fact, at least two OTDR acquisitions, launched for instance on fiber 2 and fiber 8, are required. However, even though this configuration requires more analysis for unambiguously identification of the cable type, it is still a suitable one.

It is noted that, when employing the loopback device 700, a very simple test system may be used to unambiguously identify the cable type wherein a single light source is connected to input port 5 and the polarity detector comprises only three light detectors, e.g., respectively on optical fiber paths 1, 2 and 3 (light detectors A, B, C). No optical power splitter is required in this case.

Test Instrument

Figure 10:
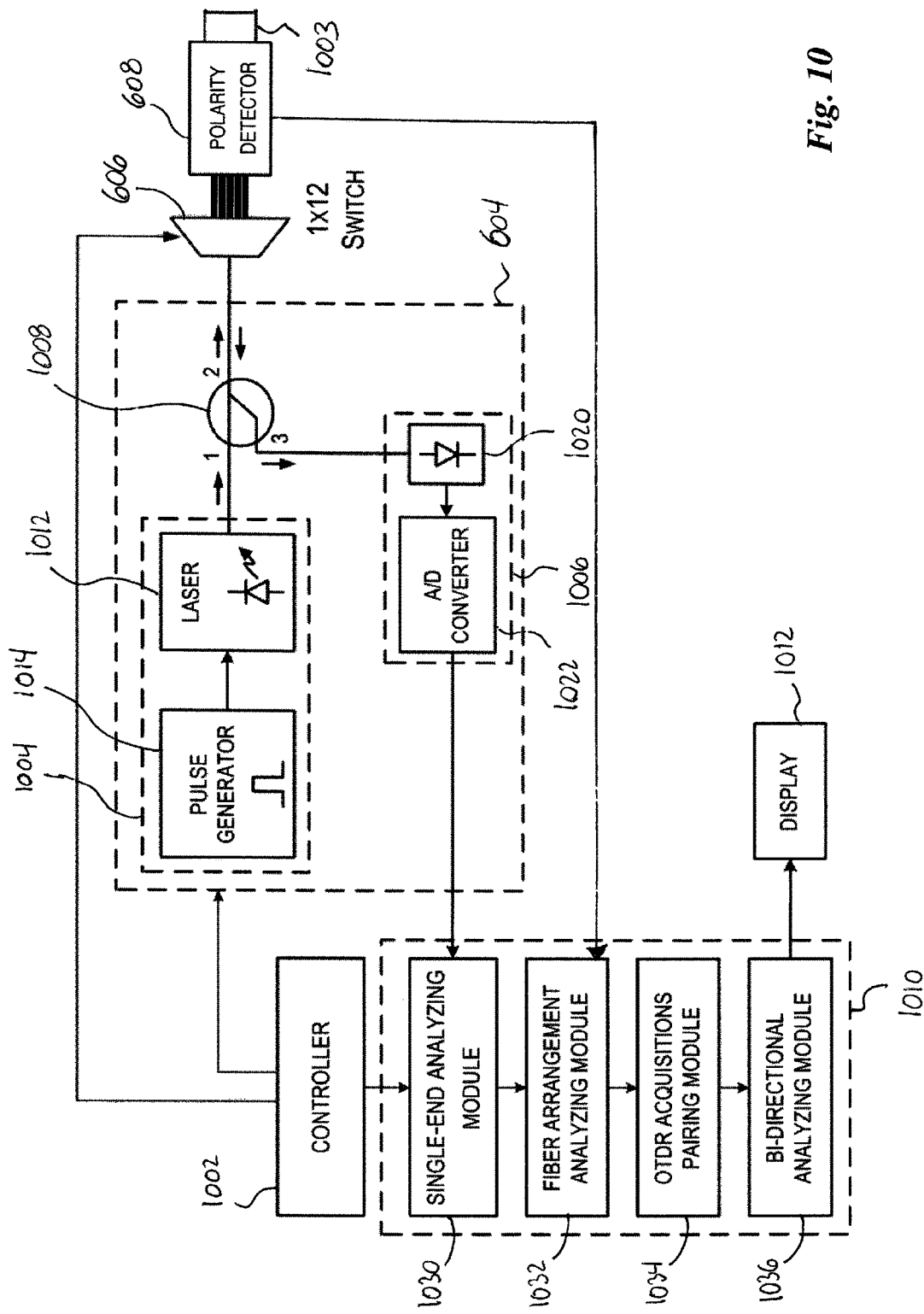
FIG. 10 is a block diagram illustrating in more detail the test instrument of the optical reflectometry system of FIG. 6, in accordance with one embodiment.

FIG. 10 illustrates the test instrument 618 of FIG. 6 in more detail. The test instrument 618 comprises the OTDR device 604, the optical switch 606, the polarity detector 608, a controller 1002, an analyzing module 1010, a display 1011 and an output MPO adaptor 1003 for connecting the test instrument 618 to the launch cable 610 (not shown).

The OTDR device 604 comprises a light generating assembly 1004, a detection assembly 1006, a directional coupler 1008 and an analyzing module 1010. The light generating assembly 1004, the detection assembly 1006 and the directional coupler 1008 are generally embodied in the OTDR device 604, while the analyzing module 1010 may be either integrated or partially integrated with the optical hardware including the OTDR device 604, the optical switch 606 and the polarity detector 608, or may be completely physically separate from the optical hardware. Similarly, as mentioned hereabove, in this embodiment the optical switch 606 and the polarity detector 608 are integrated in the test instrument 618. However, they could be provided as separate devices to be connected together for performing a fiber arrangement identification method.

The light generating assembly 1004 is embodied by a laser 1012 driven by a pulse generator 1014 to generate the test signal comprising test light pulses having desired characteristics. As known in the art, the light generating assembly 1004 is adapted to generate test light pulses of varied pulsewidths and optical power through a proper control of the pattern produced by the pulse generator 1014. One skilled in the art will understand that it may be beneficial or required by the application to perform OTDR measurements at various different wavelengths. For this purpose, in some embodiments, the light generating assembly 1004 is adapted to generate test light pulses having varied wavelengths by employing a laser 1012 that is tunable for example. It will be understood that the light generating assembly 1004 may combine both pulsewidth and wavelength controlling capabilities. Of course, different and/or additional components may be provided in the light generating assembly, such as modulators, lenses, mirrors, optical filters, wavelength selectors and the like.

The light generating assembly 1004 is coupled to the output of the OTDR device 604 through a directional coupler 1008, such as a circulator, having three or more ports. The first port is connected to the light generating assembly 1004 to receive the test light pulses therefrom. The second port is connected to the output 1016 of the OTDR device 604. The third port is connected to the detecting assembly 1006. The connections are such that test light pulses generated by the light generating assembly 1004 are coupled to the output of the OTDR device 604 and that the return light signal arising from backscattering and reflections along one of the optical fiber links 616 (see FIG. 6) is coupled to the detection assembly 1006.

The detection assembly 1006 comprises a light detector 1020, such as an avalanche photodiode, which detects the return light signal corresponding to each test light pulse, and a converter 1022 to convert the electrical signal proportional to the detected return light signal from analog to digital in order to allow processing by the OTDR trace analyzing module 1010. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. An OTDR trace nominally corresponds to a single test light pulse but may also be obtained from averaging multiple acquisitions performed under the same conditions. Of course, the OTDR device 604 may also be used to perform multiple acquisitions with varied pulsewidths to obtain a multi-pulsewidth OTDR acquisition. The thereby obtained OTDR acquisitions will be typically stored in memory within the analyzing module 1010 for further processing.

The controller 1002 is used to control the acquisition conditions for each light acquisition, by controlling the light generating assembly 1004 to generate test light pulses having variable pulsewidths, wavelengths and/or optical power, as well as to control the optical switch 606 in order to select toward which one of the optical fiber links 616 an OTDR acquisition is to be undertaken. It will however be understood that the controller 1002 as well as the analyzing module 1010 are typically implemented in a software comprising computer-readable instructions that are to be executed by a processor. The processor may be integrated, partially integrated or physically separate from the optical hardware including the OTDR device 604, the optical switch 606 and the polarity detector 608. It will be understood by one of ordinary skill in the art that the processor embodying the analysis module 1010 may be implemented as a microprocessor, a central processing unit (CPU), a microcontroller, etc. and may form part of a computer system integrated in the test instrument 618.

The controller 1002 controls parameters of the light generating assembly 1004 according to parameters that are either provided by the operator of the test instrument 618 or determined by the test instrument itself according to methods known in the art. The controller 1002 also controls the optical switch 606 to direct the OTDR test signal to a selected one of the MPO port of the output MPO adaptor 1003 in order to launch an OTDR acquisition to a selected one of the optical fiber links 616 and, in the opposite direction, receive the return signal (returning from the selected optical fiber link) back to the OTDR device for acquiring a corresponding OTDR trace. Selection of the optical fibers link 616 toward which to launch the OTDR acquisition may be input by the operator of the test instrument 618 or may be automated by the controller 1002. In one embodiment, the controller 1002 may successively launch OTDR acquisitions toward each optical fiber links 616 automatically. The OTDR traces acquired from the optical fiber links 616 are then received and analyzed by the analyzing module 1010.

The analyzing module 1010 may be embodied by hardware and software and, as mentioned hereinabove, may be integral, partially external or totally external to the OTDR device 604 used to perform the acquisitions. The analyzing module 1010 performs the calculations necessary to characterize events along one of the optical fiber links 616 and to identify the fiber arrangement of the cable link under test 602, comprised in the optical fiber links 616. The optical fiber links 616 typically each comprise one or more events located at undetermined positions therealong. The analyzing module 1010 identifies and characterizes the events along each tested optical fiber link 616 through analysis of one or more OTDR traces and identifies the fiber arrangement of the cable link under test 602. The analyzing module 1010 typically comprises a single-end analyzing module 1030, a fiber arrangement analyzing module 1032, an OTDR acquisition pairing module 1034 and a bi-directional analyzing module 1036.

The single-end analyzing module 1030 first performs single-end analysis of each OTDR acquisition. Events along the fiber link under test 616 are identified on the corresponding OTDR trace(s) and a list of events is created. Identification of the events may be made according to their locations, i.e. the distance along the optical fiber link at which the event is identified. It is common in the art to identify events on an OTDR trace by analyzing the OTDR trace to identify a localized drop in the backreflected/backscattered light and/or a reflection peak. The presence of one or the other will generally be interpreted as an event. It is also common in the art to characterize events along an optical fiber link by attributing values to three different parameters: the location of the event along the optical fiber link, the insertion loss associated with the event and the reflectance at the event (when present). Depending on the circumstances, one or a plurality of these parameters may be evaluated for a given event. It is also common to characterize optical fiber segments between the identified events by attributing a value of an attenuation parameter thereto.

The single-end analyzing module 1030 typically stores the single-end characterization result and the OTDR traces as a single-end OTDR measurement file or table. Each single-end OTDR measurement is tagged or otherwise associated with the specific port as selected by the optical switch 606.

The fiber arrangement analyzing module 1032 identifies the fiber arrangement in the cable link 602 from signal produced by light detectors 510 (see FIG. 5) of the polarity detector 608. For this purpose, a characterization of the loopback arrangement of the loopback device 614 may be either provided to the analyzing module 1010 (as a file saved in memory for example) or predetermined by the test instrument 618 through a prior calibration. For example, a characterization of the loopback arrangement may be provided as a table listing the combinations of light detection corresponding to each possible fiber arrangement (e.g., a table similar to the table of FIG. 7B).

The fiber arrangement analyzing module 1032 receives a launch identifier from the controller 1002 indicating toward which optical fiber port the OTDR acquisition was launched, as well as a light presence identifier indicating which one of the light detectors 510 (see FIG. 5) have detected presence of light. For example, as shown in Table 3 below, the light presence identifier may take the form of an array of binary results, one result for each detector where a '1' indicates light presence detection and a '0' indicates no light presence detection (i.e. absence of light).

A characterization of the loopback arrangement is provided (see FIG. 7B for example). For example, the loopback arrangement characterization may be recorded in the form of a lookup table (as exemplified in Table 3 for a light launched in fiber 5 in the example loopback arrangement of FIG. 7A) and which relates the light presence identifier to the fiber arrangement. From the characterization of the loopback arrangement, the fiber arrangement analyzing module 1032 may then identify the fiber arrangement. For example, in the case of light launched toward port 5, the light presence identifier unambiguously indicates the cable type. If the light presence identifier indicates a light presence detection on detector B, then a Type A cable is identified; if test light is detected on detector A, then a Type B cable is identified (no key inversion/no pair twist); if test light is detected on detector C, then a Type C cable is identified (key inversion/pair twist); and if test light is detected on detector D, then no key inversion with pair twists configuration is identified.

TABLE 3

Loopback arrangement characterization for the loopback arrangement of FIG. 7A
Test light on fiber 5

| Light presence identifier | | | | |
|---|---|---|---|---|
| A | B | C | D | Cable Type |
| 0 | 1 | 0 | 0 | Type A: KI/no PT |
| 1 | 0 | 0 | 0 | Type B: no KI/no PT |
| 0 | 0 | 1 | 0 | Type C: KI/PT |
| 0 | 0 | 0 | 1 | B + C Cables: no KI/PT |

Of course, as discussed hereinbefore, in some embodiments, more than one OTDR acquisition may be required to unambiguously identify the fiber arrangement. The determined fiber arrangement may be displayed on screen or otherwise output to an operator of the test instrument 618, in the form of an identified cable Type or equivalent cable Type of example. The determined fiber arrangement may also be compared to an expected fiber arrangement received as an input or otherwise provided to the test instrument. Any discrepancy between the expected and the determined fiber arrangement may then be flagged and displayed on screen or otherwise output to the operator. Furthermore, if the combination of signatures does not match any known optical fiber arrangement, the fiber arrangement analyzing module 1032 may flag this situation and display a warning on screen or otherwise output a warning to the operator.

Then, in addition to identifying the fiber arrangement, it may be required to characterize each optical fiber link of the cable link under test 602. In this respect, OTDR acquisitions should be performed for each port of the output MPO port 1003.

The OTDR acquisitions pairing module 1034 then pairs OTDR acquisitions performed onto optical fibers that are looped back together at the loopback device. In one embodiment, once the cable type is identified, the pairing is based on the combination table corresponding to the identified cable type. For example, the OTDR acquisition performed toward port 5 is simply paired with the OTDR acquisition performed toward port 2, based on the table of FIG. 7B.

Once the OTDR acquisitions are paired, the bi-directional analyzing module 1036 performs bi-directional analysis of the paired OTDR acquisitions as known in the art, based for example on the previously generated and stored single-end OTDR measurement files or table. In this specific embodiment, events of the forward-direction list of events are matched with events of the backward-direction list of events using their respective location along the optical fiber link 616 and bi-directional insertion losses and reflectances are calculated for events of the list, using single-end insertion loss and reflectance values stored in single-end OTDR measurement files or tables. Actual bidirectional attenuation values may also be calculated for each optical fiber segment, from "apparent" single-end attenuation values. Of course, other ways known in the art to conduct bi-directional analysis may be employed. Then, knowing the lengths of the launch and receive cables, as well as that of the signature array and the loopback device, characterization of the cable link 602 alone may be extracted from the bi-directional OTDR analysis results and tier 2 characterization of the cable link 602 be completed. It is noted that lengths of the launch and receive cables may be determined from a prior reference step, may be input by the operator or may be determined by the test instrument from the actual OTDR acquisitions for example.

Single-end and bi-directional analysis results may be saved in memory as a file or may be graphical displayed on screen, printed or the like in the form of an event table, a graphical link element view and/or a loss and reflectance profile view, or in any other form. In the illustrated example of the test instrument 618, the results are shown on the display 1012 which may either be integral or external to the test instrument 618. OTDR analysis results may also be further processed by testing them against pass/fail criterions for example.

It will be readily understood that several variants of OTDR exist and may be devised, and that the use of this designation herein in not meant to limit the scope of the present specification to any of such variants. One skilled in the art will also understand that other optical components may be added to the OTDR device 404 for referencing purposes for example. For instance, in some embodiments (not illustrated), an internal reference reflector may be connected to a fourth port of the directional coupler 108. This reference reflector allows fluctuations in OTDR power levels due to aging or thermal effects to be tracked and compensated by performing normalization between acquisitions, thereby providing more accurate measurements (see U.S. Pat. No. 5,754,284 (LEBLANC et al.), commonly owned by the applicant).

One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace. It will also be understood that other factors may need to be controlled during the light acquisitions or from one light acquisition to the next, such as gain settings, pulse power, etc. as is well known to those skilled in the art.

Furthermore, the described systems and methods may also involve performing additional light acquisitions under varying acquisition conditions. For example, the systems and methods described herein may further employ multi-pulsewidth bi-directional OTDR analysis, as described in US Application Publication no. US2014/0198311A1 to L'Heureux et al. dated Jul. 17, 2014 and which is commonly owned by Applicant and hereby incorporated by reference.

Figure 11:
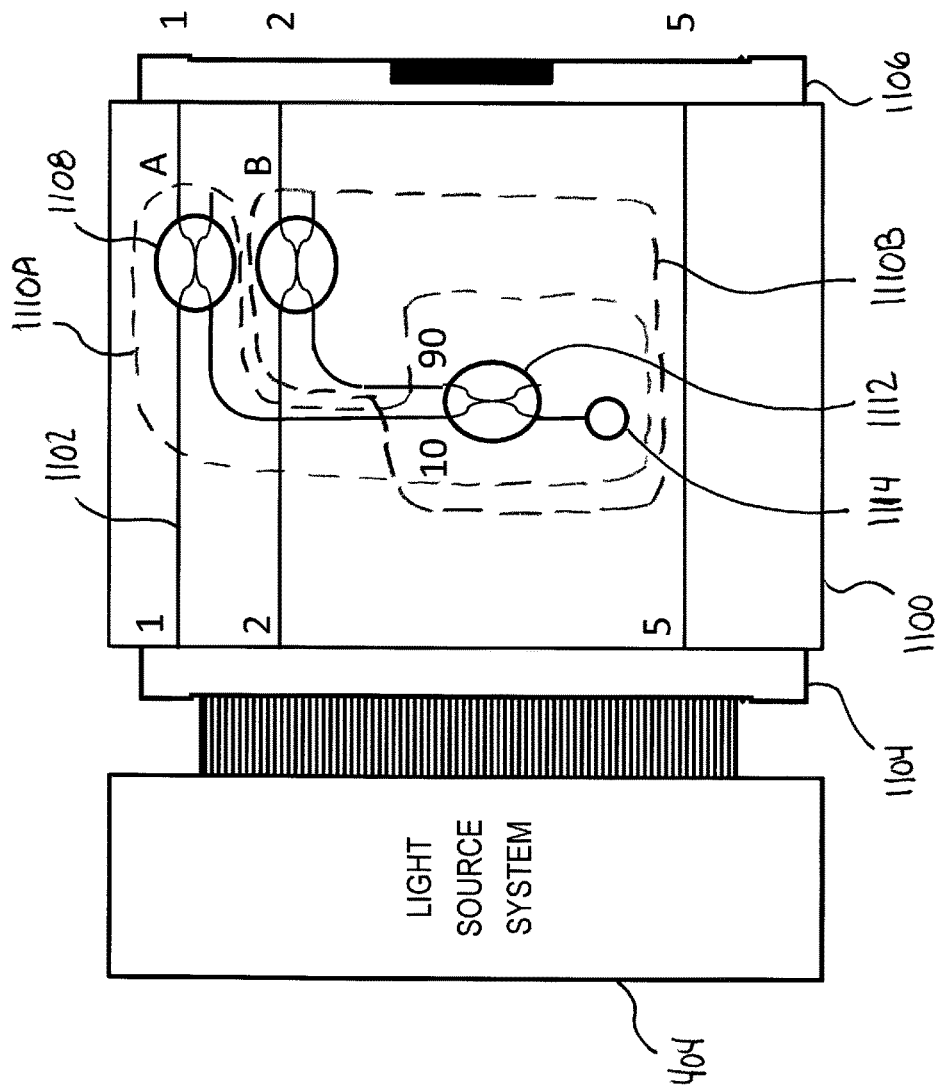
FIG. 11 is a schematic illustrating a polarity detector to be used in the test system of FIG. 4, in accordance with another embodiment employing an optical power amplitude encoder.

FIG. 11 illustrates a further exemplary embodiment 1100 of the polarity detector 408 to be employed in the test system 400 of FIG. 4 or the OTDR system 600 of FIG. 6. The polarity detector 1100 consists of a variant of the polarity detector 500 and comprises at least three optical fiber paths 1102 (associated with optical fiber ports 1, 2 and 5), an input MPO connector 1104 to be connected toward the light source system 404 and an output MPO connector 1106 to be connected toward the cable link under test 402 or a launch fiber. The polarity detector 1100 further comprises a presence detector 1110A, 1110B on at least two of the optical fiber paths 1102 to detect presence of light returning from at least two optical fiber links. Each presence detector 1110A, 1110B comprises an optical power splitter 1108 disposed along the corresponding optical fiber path 1102 but both presence detectors 1110A, 1110B share a same and single light detector 1114. Returning light extracted from the optical fiber paths 1102 are combined towards the light detector 1114 with an optical power amplitude encoder 1112 embodied in this case by an unbalanced optical power coupler (e.g., 10/90). In the specific example of FIG. 11, the higher coupling ratio of the optical power combiner 1112 is associated with optical fiber path B and the lower coupling ratio is associated with optical fiber path A. As explained herein above, only presence of light returning from optical fiber links to the polarity detector 1100 need to be determined in order to allow discrimination between Type A, Type B and Type C cables. Detection of a higher power level of returning test light on light detector 1114 indicates presence of light of optical fiber path B whereas detection of a lower power level of returning test light on light detector 1114 indicates presence of light on optical fiber path A.

As can be inferred from FIG. 7B, detection of presence of returning light on a minimum of two optical fiber paths allows discrimination between Type A, Type B and Type C cables (when putting aside potential combination of cables). More specifically, assuming the loopback of FIG. 7B and assuming a polarity detector comprising presence detectors 1110A, 1110B, when test light is launched on port 5, presence of test light at detector A indicates a Type B cable, presence of test light at detector B indicates a Type A cable and absence of test light on both detectors A and B indicates a Type C cable. Therefore, the minimum number of presence detection required to discriminate between Type A, Type B and Type C cables is two, which can be implemented using the single light detector 1114 combined with the optical power amplitude encoder 1112.

It will be understood that optical power amplitude encoders may also be used to modify the other configurations of polarity detectors described herein to cut by half the number of light detectors. For example, in the polarity detector 500 of FIG. 5, the number of light detectors 510 can be cut by half by using an optical power amplitude encoder and a single light detector to implement presence detectors A and B, and so on for presence detectors C and D; E and F; G and H; I and J.

In another embodiment, the light source is configured to generate a test signal at two wavelengths and the optical power amplitude encoders are replaced by optical wavelength encoders implemented by, e.g., wavelength selective splitters where each output ends of each wavelength selective splitter is connected to a light detector.

Referencing

As mentioned hereinbefore, a predetermined MPO connection convention should be respected when interconnecting the OTDR device 604, the optical switch 606, the polarity detector 608 (the later three being herein integrated in the test instrument 618), the launch cable 610, the cable link under test 603, the receive cable 612 and the loopback device 614 in order to allow proper fiber arrangement determination on the cable link under test 602. This convention may be either verified or determined via a reference step that is optionally conducted before performing OTDR characterization of the cable link under test 603.

In order to perform this reference step, in one embodiment, a reference link is made by directly interconnecting the OTDR device 604, the optical switch 606, the polarity detector 608, the launch cable 610, the receive cable 612 and the loopback device 614 (i.e. the test system 600 of FIG. 6, with the cable link under test 602 and one MPO adapter 620 missing). OTDR acquisitions are then undertaken on the reference link by successively launching one or more OTDR acquisitions toward at least one fiber of the reference link.

For example, in the case of the embodiment of FIG. 7, only one OTDR acquisition launched toward port 5 may be sufficient to verify the interconnection convention. If presence of light is detected on light detector B, the interconnection convention is respected.

However, in order to provide a complete characterization of the OTDR system 600, including the loopback arrangement characterization of the loopback device 614, OTDR acquisitions should be launched successively to each port of the optical switch 606. The test instrument may then determine or verify the MPO convention from the light presence detections.

The same OTDR acquisitions may also be used by the test instrument to determine the lengths of the optical fibers of the launch and receive cables 610, 612 and the loopback device 614.

Once the reference step is completed, the launch and receive cables 610, 612 are disconnected from one another and the cable link under test 602 with a predetermined type of MPO adapter 620 is inserted therebetween, without disconnecting the other parts of the OTDR system 600.

Duplex Optical Cabling

It should be noted that the system 400 of FIG. 4 or the OTDR system 600 of FIG. 6 may also be employed to verify a fiber polarity in combinations of MPO cables, optical fiber transition modules and duplex cables. In this case though, it is not sufficient to simply identify the presence of MPO key inversion and MPO duplex pair twists as a whole (as described hereinbefore with reference to FIGS. 7, 8 and 9) in order to unambiguously identify the fiber arrangement. In this case, because each individual duplex cable could be twisted, OTDR acquisitions need to be undertaken for each individual optical fiber link 616. Light presence detection on the polarity detector 608 then allows polarity verification and fiber arrangement identification.

Universal Polarity Management Method

It should be noted that the system 400 of FIG. 4 or the OTDR system 600 of FIG. 6 may also be employed to verify proper utilization of proprietary MPO cables or optical fiber transition modules, such as that of the Universal Polarity Management Method by Corning™. For example, if the cable link under test employs the Universal Polarity Management Method by Corning™, the fiber arrangement analysis should find no key inversions and pair twists (as in the combination of a Type B cable, a Type A adaptor and a Type C cable). However, should a conventional optical transition module (as defined in the TIA/EIA-568-C.3 Standard) be mistakenly connected instead of a Corning™ optical fiber transition module for example, the system 400 or the OTDR system 600 would identify that the fiber arrangement does not follow any known convention and therefore display an appropriate warning to the operator. The system 400 or the OTDR system 600 may also further be able to identify some problematic connections such as the use of a Corning™ optical fiber transition module with a conventional optical transition module, using signatures identified in the acquired OTDR traces, and indicate this diagnostic on screen for example.

It is noted that although reference is made herein to single-row multi-fiber cables and connectors, the OTDR systems described herein may be modified for other types of multi-fiber array cables and connectors including but not limited to 2×12, 6×12 and 2×16 MPO cables.

It is also noted that, although very uncommon in the industry, it is envisaged that the fiber ports not be disposed in an array on the MPO connector but rather employ any different disposition.

As mentioned hereinabove, bi-directional OTDR analysis is currently recommended by standard organizations for characterizing insertion loss in singlemode optical fiber links. It should however be understood that at least some of the systems and methods described herein may also be applied to characterize multimode optical fiber links.

Although illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated herein is thus only provided for efficiency of teaching the described embodiment.

The embodiments described above are intended to be exemplary only. The scope of the invention is therefore intended to be limited solely by the appended claims.

What is claimed is:

1. A system for identifying a fiber arrangement in a multi-fiber cable link comprising a number of optical fiber links each connected between a front multi-fiber connector, at a near end of said cable link, and an end multi-fiber connector, at a far end, according to said fiber arrangement, the system comprising:
    at least one light source to be coupled toward said cable link at said near end for launching test light toward at least one of a plurality of said optical fiber links;
    a loopback device to be coupled to said cable link at said far end and comprising optical fiber loops arranged to couple each of the optical fiber ports of the end multi-fiber connector to another of its optical fiber ports; and
    a polarity detector to be coupled to said cable link at said near end and comprising at least two presence detectors to be coupled to respective ones of the optical fiber links, each one of said presence detectors connected toward a corresponding optical fiber link so as to detect presence of test light received therefrom.

2. The system as claimed in claim 1, where each one of said presence detectors comprises a light detector.

3. The system as claimed in claim 1, wherein said light source is comprised in an optical time-domain reflectometry acquisition device and wherein said test light launched by said light source comprises optical time-domain reflectometry (OTDR) test light pulses.

4. The system as claimed in claim 1, further comprising an optical switch coupled to said light source and controllable to successively direct light from said light source toward said plurality of said optical fiber links.

5. The system as claimed in claim 1, wherein at least two optical fiber loops of said loopback device each couple optical fiber ports that do not pertain to a same pair of an inclusive set of distinct pairs of adjacent optical fiber ports and wherein said at least two optical fiber loops do not couple optical ports of two same pairs of said set.

6. The system as claimed in claim 4, wherein a loopback arrangement of said loopback device is not mirror symmetric relative to a transverse line of symmetry of an optical fiber port arrangement of said end multi-fiber connector.

7. The system as claimed in claim 1, further comprising a processor configured to identify a fiber arrangement in said multi-fiber cable link from light detections performed by said light detectors when said light source, said polarity detector, said multi-fiber cable link and said loopback device are interconnected.

8. The system as claimed in claim 7, wherein said processor is further configured to pair optical reflectometry acquisitions that are performed onto optical fiber links of said multi-fiber cable link that are looped back together, and to perform a bidirectional optical reflectometry analysis using the paired optical reflectometry acquisitions to characterize each of the said optical fiber links that are looped back together.

9. The system as claimed in claim 1, wherein said presence detectors comprise at least two optical power splitters to be coupled to respective ones of the optical fiber links and to a corresponding one of the at least two light detectors, each said optical power splitters connected such that part of light received from said light source is directed toward one of the optical fiber links and part of light received from said one of the optical fiber links is directed to the corresponding light detector.

10. The system as claimed in claim 9, wherein optical power splitters are fiber couplers.

11. The system as claimed in claim 1, wherein at least three optical fiber loops of said loopback device each couple optical fiber ports that do not pertain to a same pair of an inclusive set of distinct pairs of adjacent optical fiber ports and wherein said at least three optical fiber loops do not couple optical ports of two same pairs of said set, wherein a loopback arrangement of said loopback device is not mirror symmetric relative to a transverse line of symmetry of an optical fiber port arrangement of said end multi-fiber connector and wherein said polarity detector comprises at least three presence detectors connected toward corresponding optical fiber links so as to detect presence of test light received therefrom.

12. The system as claimed in claim 11, where each one of said presence detectors comprises a light detector.

13. The system as claimed in claim 12, wherein said light source is comprised in an optical time-domain reflectometry acquisition device and wherein said test light launched by said light source comprises optical time-domain reflectometry (OTDR) test light pulses.

14. The system as claimed in claim 13, further comprising an optical switch coupled to said light source and controllable to successively direct light from said light source toward said plurality of said optical fiber links.

15. The system as claimed in claim 14, further comprising a processor configured to identify a fiber arrangement in said multi-fiber cable link from light detections performed by said light detectors when said light source, said polarity detector, said multi-fiber cable link and said loopback device are interconnected.

16. The system as claimed in claim 15, wherein said processor is further configured to pair optical reflectometry acquisitions that are performed onto optical fiber links of said multi-fiber cable link that are looped back together, and to perform a bidirectional optical reflectometry analysis using the paired optical reflectometry acquisitions to characterize each of the said optical fiber links that are looped back together.

17. The system as claimed in claim 16, wherein each of said presence detectors comprises an optical power splitter to be coupled to a corresponding optical fiber link and to a corresponding light detector, each of said optical power splitters connected such that part of light received from said light source is directed toward one of the optical fiber links and part of light received from said one of the optical fiber links is directed to the corresponding light detector.

18. A test instrument for identifying a fiber arrangement in a multi-fiber cable link comprising a number of optical fiber links each connected between a front multi-fiber connector, at a near end of said cable link, and an end multi-fiber connector, at a far end, according to said fiber arrangement, the test instrument being for use with a loopback to be coupled to said cable link at said far end and comprising optical fiber loops each arranged to couple one of the optical fiber ports of the end multi-fiber connector to another of its optical fiber ports, the test instrument comprising:
  at least one light source to be coupled toward said cable link at said near end for performing optical reflectometry acquisitions toward a plurality of said optical fiber links;
  an optical switch coupled to said light source and controllable to successively direct test light from said light source toward said plurality of said optical fiber links; and
  a polarity detector coupled at one end to said optical switch and at the other end toward the output of the test instrument for coupling to said cable link and comprising at least two presence detectors to be coupled to respective ones of the optical fiber links, each one of said presence detectors connected toward a corresponding optical fiber link so as to detect presence of test light received therefrom.

19. The test instrument as claimed in claim 18, further comprising an optical reflectometry acquisition device comprising said light source.

20. The test instrument as claimed in claim 19, wherein said optical reflectometry acquisition device is an optical time-domain reflectometry (OTDR) device.

* * * * *